United States Patent [19]

Hjortzberg

[11] 4,123,774
[45] Oct. 31, 1978

[54] COLOR SIGNAL ENCODING METHODS AND APPARATUS FOR VIDEO RECORDING AND PLAYBACK

[75] Inventor: Bernhard A. Hjortzberg, Mission Viejo, Calif.

[73] Assignee: BASF Aktiengesellschaft, Ludwigshafen am Rhein, Germany

[21] Appl. No.: 766,541

[22] Filed: Feb. 7, 1977

[51] Int. Cl.² .............................................. H04N 5/79
[52] U.S. Cl. ......................................... 358/4; 358/8; 358/12
[58] Field of Search ............................. 358/4, 8, 12, 14

[56] References Cited

U.S. PATENT DOCUMENTS

| 3,617,620 | 11/1971 | Arimura | 358/4 |
| 3,717,725 | 2/1973 | Numakura | 358/4 |

*Primary Examiner*—Robert L. Richardson
*Attorney, Agent, or Firm*—Keil, Thompson & Shurtleff

[57] ABSTRACT

Methods and apparatus for translating standard broadcast format color television signals to an encoding format for use in a transfer channel, and for retranslation of the signals to broadcast format. In one form of the invention, the broadcast format chroma signal is translated directly to transfer channel format without intermediate reduction to baseband. A second form of the invention achieves the same result by intermediate reduction to baseband of the chroma signal. The transfer channel format comprises chroma information amplitude modulated at a lower frequency than frequency modulated luma information, and enjoys exceptional independence from chroma cross-talk into luma in the restored broadcast signal as well as reduced cross-color distortion due to time base error in recording/playback transfer channels. An optional interlacing system provides even greater resistance to cross modulation effects. Audio information may be inserted without difficulty at frequency bands of the transfer channel not occupied by the encoded composite video signal.

134 Claims, 7 Drawing Figures

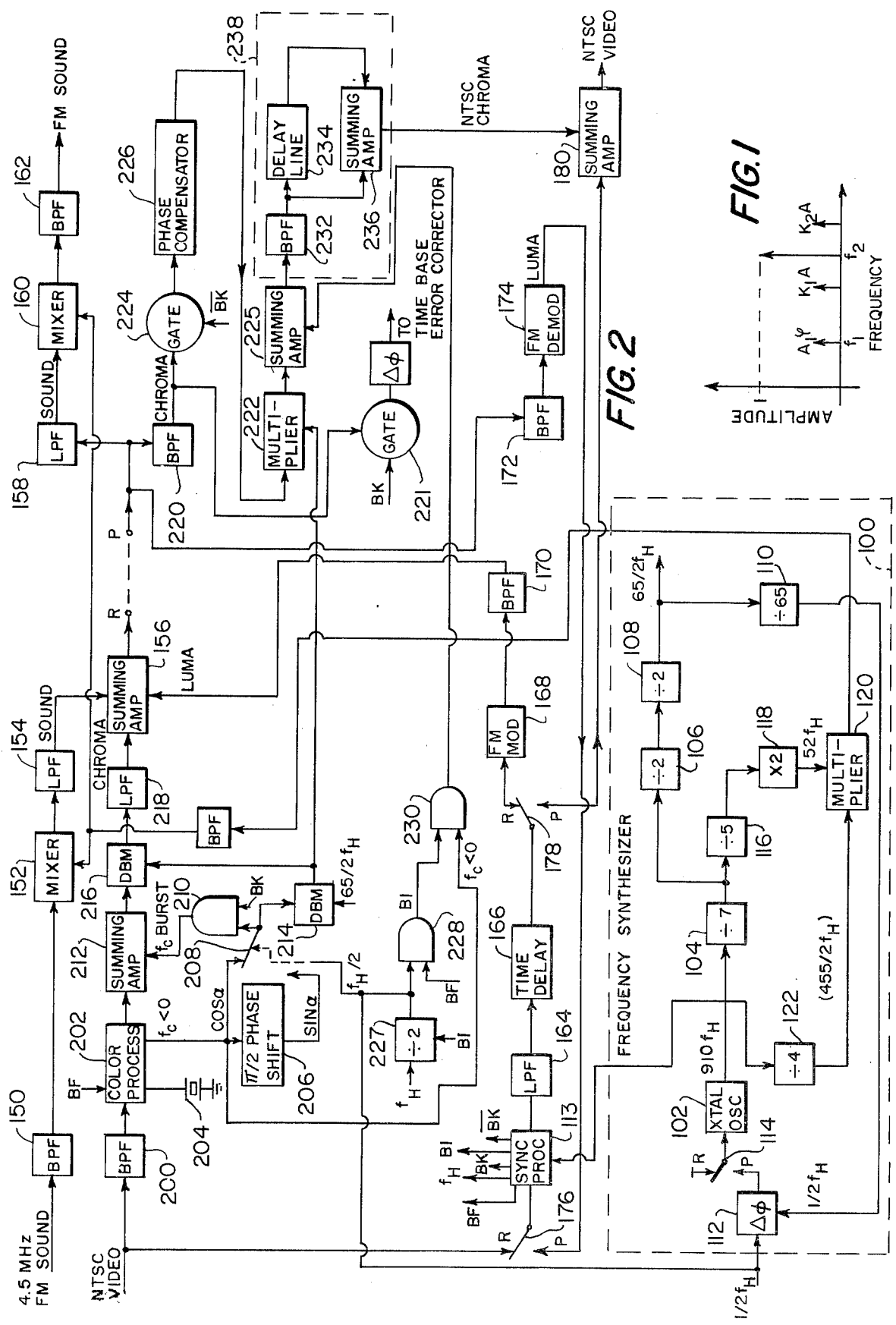

COLOR SIGNAL ENCODING METHODS AND APPARATUS FOR VIDEO RECORDING AND PLAYBACK

THE PRIOR ART

BACKGROUND OF THE INVENTION

Field of the Invention

The invention relates generally to encoding of color television signals in a transfer channel format, and restoring such signals to a standard broadcast format such as National Television Systems Committee (NTSC), Phase Alternate Lines (PAL), or SECAM, after transmission through a transfer channel. Although the invention is intended for use primarily in magnetic recording and playback of color television signals, it is equally applicable to the processing of any modulated broadband signal.

It is well known that various colors can be produced by the combination of the three primary colors, red, green, and blue in the proper relationship. Color video information, or chrominance information, is broadcast by imposing upon a black and white television signal (Y) a modulated subcarrier containing the color difference signals (R-Y, B-Y). The NTSC and PAL-M systems use a 3.58 MHz subcarrier for color transmission, while PAL-B uses a 4.43 MHz subcarrier. All these systems employ quadrature modulated color difference signals. Another system employs sequential frequency modulated color difference signals (SECAM).

In video recording, there is always present the problem of how to record the modulated color difference signal subcarrier. These subcarriers are of high frequency, and often have large amplitudes, and their recording and subsequent playback must not introduce phase errors which result in color changes. Recording of color subcarriers is especially a problem in home video recorders since they are typically designed with limited bandwidth to reduce production costs. Some such video recorders remove the subcarrier with its chrominance information, heterodyne it down to approximately between 500 KHz to 700 KHz and record this signal on tape. Two recording channels are used: one is the heterodyned color information, and the other is the luminance signal or information, the frequency band of the chroma signal being lower than that of the luma channel. In such a system, the quadrature color information is recorded as an amplitude modulated signal without frequency modulation.

Prior art systems utilizing heterodyning-down of the color subcarrier are deficient from the standpoint of color lock stability and bandwidth on playback, because the recovered color subcarrier must represent the original signal very accurately as to frequency and phase so that proper demodulation in the TV receiver is assured. Time base errors occurring during recording and playback result in consequent phase shifts, leading to incorrect decoding of the quadrature modulated chroma.

Line sequential color television systems are known wherein the broadcast format (NTSC or PAL) signal is reduced to luminance (Y) and color difference (R-Y, B-Y) signals and then recorded with the luminance information in one frequency band of the transfer channel and the color difference signals on alternating horizontal scan lines in a second frequency band. At least part of the information is generally modulated in some form. For example, U.S. Pat. No. 2,993,086, issued July 18, 1961 to H. deFrance, teaches bisequential transmission of the chroma difference signals amplitude modulated on a subcarrier at the upper frequency end of the transfer channel band and the luma signal at the lower frequencies of the band. While such a system may be adequate for broadcast transmission of color television signals, the time base error introduced by recording and/or playback with a moving medium (such as magnetic tape) results in phase angle errors in the replayed signal. Such phase errors are a function of the relatively high frequencies used for the chroma subcarrier in the patented system. Furthermore, the chroma subcarrier is not suppressed and can result in visible interference effects in the TV picture display due to cross-talk of the chroma subcarrier into the luma information. Such cross-talk is noticeable on a monochrome TV receiver or in a color TV receiver where the picture contains little or no chroma information.

Another example of bisequential color television signal encoding is disclosed in U.S. Pat. No. 3,717,725, issued Feb. 20, 1973 to T. Numakura, wherein the color difference signals are recorded bisequentially in frequency modulated form on a chroma carrier which is at a lower frequency than the FM luma carrier. Such a system, having the chroma carrier at a lower frequency than the luma carrier, is sometimes referred to as a "color under" system. The advantage of using color "under" is that time base error induced by the signal transfer medium has much less distortion effect on the chroma information.

The "color under" system of the U.S. Pat. No. 3,717,725, however, has some inherent disadvantages. One is that the chroma and luma information components of the TV signal are both frequency modulated. This means that cross-modulation of chroma into luma in the transfer channel appears chiefly as FM sidebands in the FM luma signal and is visible as an interference pattern on the TV screen. Naturally, the luma channel frequency demodulator cannot discriminate luma signal from chroma signal where both appear as frequency modulated within the FM luma signal bandwidth. Another disadvantage of the said patent system is that the modulated chroma signal must be kept at such a high level with respect to the luma carrier level that cross-modulation effects are further increased. Still a further disadvantage is that no provision is made for including sound information in the encoded composite signal, thereby necessitating a separate transfer channel for adding sound. In a magnetic medium video recorder, this requires an additional transducer head with attendant circuitry, as well as a separate track on the medium. Such a requirement is incompatible with the equipment and medium cost requirements of, for example, a color video recorder for home use.

Other publications teaching bisequential FM chroma systems include German Patent No. DOS 1,512,299, published Oct. 30, 1969, and German Published Application DAS 1,762,994, published Aug. 23, 1973. The former discloses a "color under" technique similar to that of U.S. Pat. No. 3,717,725 discussed above, and has the same cross-talk difficulties. German Patent DAS 1,762,725 teaches means for identifying the alternating red and blue lines of information, including a blue line identification signal which comprises an added pulse in alternate horizontal sync intervals of the luma signal.

Still another German Published Application, DAS 2,110,104, published May 4, 1972, teaches an encoding format of amplitude modulated chroma and frequency modulated luma, but requires that the composite signal be frequency modulated on a further transfer channel carrier.

While these and other color video signal encoding schemes have been devised in order to meet the long felt need for allowing transmission of the complete wide band color video signal without substantial distortion in a transfer channel having a limited bandwidth, none has successfully overcome the obstacles to meeting this need at an acceptable cost.

SUMMARY OF THE INVENTION

The present invention comprises generally methods and arrangements for solving a number of basic problems associated with recording on and/or replay from a storage medium of a composite video signal. The storage medium may be a magnetic tape or disc, optical disc or the like. The invention is equally applicable, however, to transfer of any wideband signal through a transfer channel.

In all forms of the invention described below, a composite video signal in standard broadcast format (such as NTSC, PAL-B, PAL-M or "SECAM") is separated into luma, chroma and FM audio components. The luma portion is frequency modulated on a carrier so as to occupy the upper range of the limited transfer channel bandwidth, while the audio is frequency modulated on a carrier in the lower frequency range of the transfer channel. Chroma information is translated to bisequential amplitude modulated suppressed carrier to occupy an intermediate range in the transfer channel bandwidth. Numerous advantages result inherently from this arrangement, including exceptional resistance to distortion induced by time base error in the transfer channel, resistance to cross-modulation of the chroma carrier into the luma information, suppression of beats in the chroma signal, and suppression of cross-talk of audio information in the chroma signal.

A first embodiment of the invention translates chroma information directly from NTSC, PAL-B or PAL-M encoding to the desired transfer channel format and vice versa, while a second embodiment reduces the chroma signal to baseband in an intermediate step of the translation. An optional interlacing technique of the invention may be readily implemented for further improving rejection of chroma cross-talk in the luma signal which might otherwise appear as a pattern in the picture display. Since only minor circuit changes are needed to use the translating arrangements of the invention with either NTSC, PAL-B, PAL-M or SECAM broadcast signals, production costs are expected to be reduced from those expacted for systems which are specifically designed for use with only one of the international broadcast formats.

Furthermore, since the composite encoded transfer channel signal of the invention is the same regardless of the source of the translated broadcast signal (NTSC, PAL-B or PAL-M), international compatibility of the system is assured. For example, if an NTSC video signal translated to the format of the invention is recorded on a magnetic tape, the tape may be played back in PAL format to a PAL television receiver on a playback device using nearly the same signal translating circuitry as for use with an NTSC format receiver. The universality of this arrangement lends itself well to international distribution of pre-recorded magnetic tapes, since the signal on the tape is independent of any particular receiver requirements. The tape need only be played back to a conventional TV receiver (of any of the above-noted broadcast formats) by an apparatus having translation circuitry adapted for restoring the appropriate corresponding broadcast format signal from the universal transfer channel signal.

It is accordingly an object of the present invention to provide signal encoding methods and circuits which permit a wide band signal to be recorded on and/or replayed from a recording medium subject to time base error, while minimizing the effects of such error on the replayed signal.

Another object of the present invention is to provide methods and circuits for translating a standard broadcast format color video signal to a signal format which may be recorded on a storage medium, replayed with time base error, and restored to a standard broadcast format video signal of commercially acceptable quality.

Still a further object of the present invention is to provide methods and circuits for restoring a wide band signal encoded according to the invention to a standard format usable in conventional signal receivers.

These and other objects of the present invention will be apparent to those skilled in the art in view of the following description of the invention.

BRIEF DESCRIPTION OF THE DRAWINGS

FIG. 1 shows the effect of cross-talk of the chroma information into the luma information of the signal encoded according to the invention.

FIG. 2 shows a first arrangement for encoding an NTSC color video signal according to the present invention.

DETAILED DESCRIPTION OF THE PREFERRED EMBODIMENTS

Figure 3:
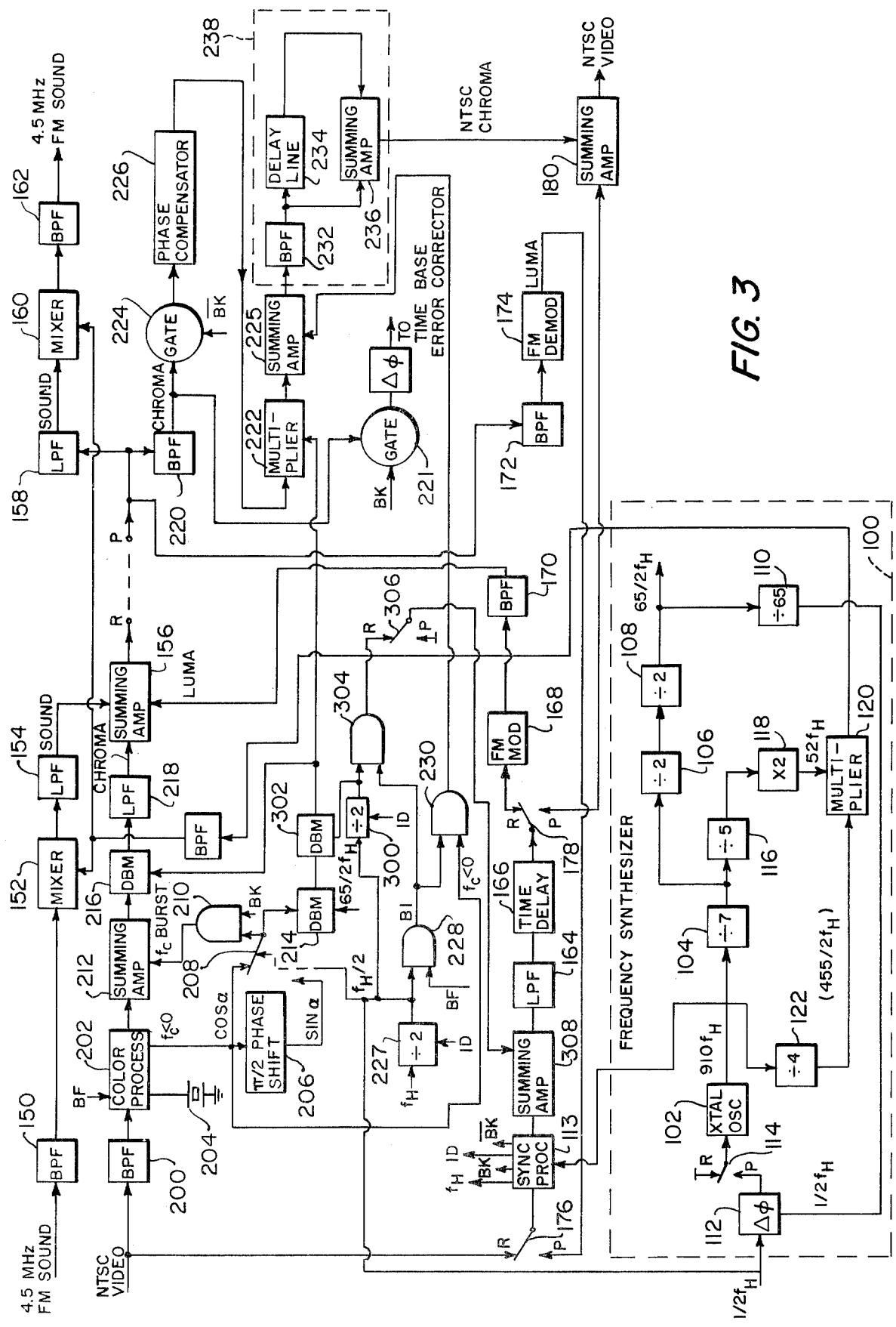
FIG. 3 shows a modification of the FIG. 2 arrangements for accomplishing interlacing of chroma carrier cross-talk into the luma signal.

The present invention employs a particular signal encoding arrangement for recording and playing back a color television signal with much less time base error distortion and cross-modulation effect between the chroma and luma signals than is present in the many prior art systems. Before detailing specific circuit arrangements, it is helpful to consider an analysis of the signal encoding arrangement of the present invention which illustrates one advantageous characteristic thereof. Specifically, cross-talk of the AM chroma subcarrier into the FM luma signal is inherently compensated to a large degree, and the small remaining effects may be readily compensated by a simple interlacing arrangement which forms a further part of the invention. According to the invention, a standard NTSC or PAL format color television signal is translated to a transfer channel format in which the luma information is frequency-modulated on a carrier at the upper frequency band of the transfer channel, the chroma information in line-sequential form is amplitude modulated on a suppressed carrier at a frequency well below that of the luma carrier. The audio information may be recorded at the lower end of the transfer channel band in frequency modulated form, for example.

Consider now the frequency spectrum for the signal carriers shown in FIG. 1, with the FM luma carrier at a frequency $f_2$ and the AM chroma carrier at a lower frequency $f_1$ and amplitude A. If the phase $\phi$ of the modulated chroma carrier is constant (which is true for line sequential AM chroma having no phase modulation), cross modulation of the luma and chroma carriers will result in sidebands about the $f_2$ luma carrier at frequencies $f_2 - f_1$ and $f_2 + f_1$, these sidebands having amplitudes $K_1 A$ and $K_2 A$, respectively, where A is a constant. If $K_1 = K_2$, the sidebands will comprise only amplitude modulation of the FM luma signal by the chroma signal which is automatically suppressed upon frequency demodulation of the luma signal. However, in general $K_1 = K + \Delta_1$ and $K_2 = K + \Delta_2$ where K represents that portion of each sideband which corresponds to amplitude modulation of the FM luma signal and $\Delta_1$, $\Delta_2$ represent that portion which corresponds to frequency modulation of the FM luma signal. The AM portion (K) is much greater than the FM portion ($\Delta_1$, $\Delta_2$) of the cross-talk.

While the AM cross-talk is inherently suppressed upon luma demodulation, the FM cross-talk leads to a visible pattern in the picture display unless provision is made to compensate for this as in the present invention. As will be evident from the description of the invention below, the visible chroma carrier pattern is compensated in two ways. First, the use of suppressed carrier AM chroma results in no chroma carrier being present when no chroma information is present. Thus, for black, white and grey level signals, the otherwise visible chroma carrier pattern in the picture display is automatically suppressed. Second, the chroma carrier pattern present in the luma signal when chroma information is present may be interlaced so that the effect thereof is averaged by the viewer's eye and goes unnoticed by the viewer.

Some prior art systems simply heterodyne quadrature modulated NTSC FM chroma information down to a center frequency $f_1$ below the FM luma center frequency $f_2$. The result of this is that the chroma phase $\phi$ is changing with the hue of the chroma signal content and shows up as frequency modulation of the FM luma signal at sideband frequencies $f_2 \pm f_1$. Such FM chroma cross-talk into the luma signal cannot be readily compensated to produce an acceptably interference-free picture. For line sequential chroma amplitude modulated on a suppressed carrier $f_1$ the phase of $f_1$ does not depend on the hue of the chroma. Consequently, no FM cross-talk occurs into the luma channel.

Crosstalk between two signals recorded or transmitted through a channel possessing some amount of non-linearity is dependent upon the product of the amplitudes of both signals, as well as the amplitude transfer characteristic of the transfer channel itself. By maintaining the maximum amplitude of the chroma signal below a fraction of amplitude of the carrier of the luma signal, non-linear characteristics of the recording medium produce no visible cross-talk. For magnetic recording media, it has been found that said fraction is dependent on the total dynamic range of the medium. Typical values of said fraction being less than 1/5 have been used in recordings rendering a playback with said cross-talk invisible. With a particular choice of frequencies of the chroma sidebands about the suppressed carrier it is actually possible to employ a maximum chroma amplitude higher than 1/5 because the visibility of the cross-products is further reduced due to interlace effects between pairs of line pairs and pairs of frame-pairs. Such frequencies are $(2n + 1) \frac{1}{2} f_H \pm \frac{1}{4} f_H$.

The signal encoding arrangement of the present invention reduces cross-talk of chroma into luma in the following ways:

(1) AM chroma and FM luma results in primarily amplitude modulation cross-talk of chroma into luma, which is inherently rejected upon luma demodulation;

(2) Suppressed carrier chroma modulation means that no chroma carrier is present during periods of no chroma information, hence grey level signals have no chroma carrier modulation products and no chroma carrier pattern appears in the picture display;

(3) Line-sequential chroma avoids the large FM cross-talk to chroma into luma which occurs with quadrature-modulated chroma; and (4) FM cross-talk of AM chroma into FM luma is sufficiently small and predictable that a simple interlace technique can eliminate its visible effects in the picture display.

A preferred circuit arrangement according to the present invention, shown in FIG. 2, provides for translating a color television signal encoded in a broadcast format (such as NTSC or PAL Standard) directly into a desired transfer channel (such as a magnetic tape channel) format having a different color subcarrier frequency from that of the broadcast format. With the FIG. 2 arrangement, it is unnecessary to reduce the chroma signal to baseband prior to encoding in the desired transfer channel format.

Shown enclosed in dashed lines in the lower left hand portion of FIG. 2 is a frequency synthesizing network 100 for supplying the transfer channel color subcarrier and other necessary frequency standards to the translating circuit. For ease of description, the chroma subcarrier of the NTSC or PAL format will be referred to as $f_c$ and the chroma subcarrier center frequency for the transfer channel format as $f_T$. The symbol $\alpha$ is defined as $2\pi f_c t$ while the symbol $\beta$ is defined as $2\pi f_T t$. In a preferred embodiment according to the invention the frequency $f_T$ is in the range of 500–900 KHz and is related to the broadcast carrier frequencies in a manner which will be detailed below.

In frequency synthesizer 100 a crystal oscillator 102 gives an output signal of constant frequency equal to $910 f_H$ where $f_H$ is the horizontal lone frequency of the broadcast signal. For NTSC, $910 f_H$ equals $4 f_C$ or 14,318,180 Hz. The crystal oscillator output is divided by seven in a divider 104, and the resulting signal is then twice divided by two in dividers 106, 108 in order to obtain the frequency $65/2 f_H$ or 511 KHz. Note that 511 KHz is one seventh the NTSC color subcarrier frequency of of 3.58 MHz.

The choice of using $65/2 f_H$ or some other frequency as the chroma subcarrier is one governed by design considerations, such as possible interference of the modulated chroma signal with the luma signal, for example. For $32.5 f_H$, the 511 KHz transfer channel chroma subcarrier gives a typical upper chroma sideband limit of about 1.0 MHz (for a 1 MHz chroma signal bandwidth to about 2.7 MHz for a transfer channel having a 5 MHz bandwidth. Regardless of whether the transfer channel chroma subcarrier is 511 MHz or some other conveniently chosen value, the method of operating on the chroma signal is the same according to the present invention. The following description of the invention will be made with the assumption the $65/2\, f_H$ is the choice for transfer channel chroma subcarrier.

It will also be assumed for the present discussion that the video signal is in NTSC format, although operation of the translating circuit for PAL signals is substantially the same. Separation of the sound and video signals may be accomplished prior to the FIG. 2 circuit in any conventional manner.

The $65/2\, f_H$ frequency is divided by 65 in a divider 110 and the resulting $\frac{1}{2}\, f_H$ frequency signal is fed to a phase detector 112 and to the color processing circuitry in the upper portion of FIG. 2 which will be described in more detail below. Phase detector 112 also receives from divider 227 a $\frac{1}{2}\, f_H$ frequency signal synchronized with the horizontal line signal from a conventional video synchronization information processing circuit 113 in the luma channel. Sync processor 113 serves to derive the horizontal line frequency from the NTSC (or PAL) broadcast signal during translation from broadcast format to transfer channel format, or from the transfer channel signal when the converse translation is to be performed. This feedback of the synthesizer generated $\frac{1}{2}\, f_H$ signal serves to maintain synchronization of crystal oscillator 102 with the video signal derived $\frac{1}{2}\, f_H$ signal. As shown, a switch 114 may be provided for allowing the oscillator 102 to be free-running when the translation to transfer channel format is to be made, and slaved when the converse is to be made. It will be understood that the synchronization processor may be of any type known in the art which is suitable for supplying the needed standard video sync pulses, such as type 3262A, available from Fairchild Camera and Instrument Corporation of Mountain View, California. The sync processor is slaved to a reference frequency from the frequency synthesizer, as shown.

The broadcast format sound signal, for example 4.5 MHz FM sound, is separated from the NTSC video signal through conventional filters and is supplied via a band pass filter 150 and heterodyne means for translating down to the desired transfer channel format, for example 102 KHz FM sound, by a mixer 152 which is supplied with the 4.398 MHz reference frequency from the frequency synthesizer. A low pass filter 154 removes the higher frequency modulation components, supplying only the difference frequency 102 KHz to summing amplifier 156 for combining with encoded luma and chroma signals to form a composite transfer channel signal. The transfer channel is shown as a dashed line between "R" and "P" and may comprise signal recording on and playback from a magnetic storage medium, for example. Upon retrieval of the composite signal from the transfer channel, the 102 KHz FM sound signal is isolated by a low pass filter, heterodyned back to the broadcast format by a mixer 160 supplied with the 4.398 MHz reference and filtered by a band pass filter 162 to remove undesired modulation components. The resulting output is the restored 4.5 MHz FM sound signal which may be supplied to a conventional television sound demodulator (not shown).

The NTSC video signal entering at the left side of FIG. 2 is commonly designated in the art as comprising components $U\cos\alpha + V\sin\alpha$. With the circuit of FIG. 2 in the "Record" mode (set to translate from broadcast format to transfer channel format), switches 114, 176 and 178 having "R" and "P" positions are set to "R" as shown. After passing through conventional sync processor 113, the luma signal is separated from the composite NTSC video by low pass filter 164, passes through a time delay 166 which compensates for the longer time interval needed for chroma signal processing, is frequency modulated at, for example, 3.0 to 4.4 MHz, by modulator 168 and is band pass filtered by filter 170 to remove unwanted modulation components. The resulting FM luma signal is supplied to summing amplifier 156 for insertion into the transfer channel. Upon retrieval of the composite signal from the transfer channel, the luma component is separated by means of band pass filter 172, reduced to baseband by FM demodulator 174, and sent through switch 176 (set to the "P" position for signal retrieval from the transfer channel) to sync processor 113 for restoration of the NTSC sync information. Filter 164 removes unwanted modulation products and time delay 166 compensates for the longer time needed for chroma processing than luma processing. Switch 178, also in "P" position for retrieval mode, couples the restored baseband video signal to summing amplifier 180 for restoration of the broadcast signal.

The chroma portion of the NTSC broadcast format signal is separated by band pass filter 200 and processed by a conventional chroma processor 202, which may be a commercially available linear integrated circuit chip such as Model u A787, available from Fairchild Camera and Instrument Corporation of Mountain View, California. The chroma processor is shown connected to a crystal 204 for reference purposes and on one line of block 202 is given the NTSC color subcarrier at angle zero, $f_C\angle 0°$, designated for the following discussion as $\cos\alpha$.

The reference crystal and $f_C\angle 0°$ reference are at 3.58 MHz for NTSC and PAL-M (or 4.43 MHz for PAL-B). Phase shifting of the $f_C\angle 0°$ frequency is effected at block 206 so that both $\cos\alpha$ and $\sin\alpha$ are available at switch 208. Switch 208 is operated at one half the $f_H$ horizontal line frequency, $(f_H/2)$. With the present system only one such switch 208 is necessary, while for many prior art line sequential chroma encoding systems more than one is required.

The burst in the modulated chroma signal to be inserted in the transfer channel is generated by taking the switched color subcarrier $f_C$ from switch 208 and gating it at 210 with a horizontal blanking pulse BK from sync processor 113 to produce a burst of the $f_C$ signal which may extend the entire horizontal blanking interval and has alternating phase from line-to-line, which is maintained in proper phase relationship by controlling divider 227 with the NTSC blue line identification (BI) pulse from sync processor 113 during translation to transfer channel format. The input of divider 206 which receives the NTSC blue identification pulse is marked BI. The switched $f_C$ burst is added to the quadrature chroma information (still amplitude modulated at the 3.58 MHz NTSC frequency) at summing amplifier 212 so that the $f_T$ burst occurring in the transfer channel signal after translation will extend through the entire blanking interval. The burst need not extend the entire horizontal blanking interval in the transfer channel signal, but it has been found that such an extended burst may be advantageously used for time base correction in the case where the transfer channel is subject ot such error upon signal retrieval, such as for a magnetic tape or disc transfer channel.

A double balanced modulator 214 receives two inputs, the phase switched subcarrier $f_C$ and a further signal designated cos $\beta$, where cos $\beta$ is the transfer channel chroma subcarrier $f_T$. The output of modulator 214 is (cos $\beta$) · (cos $\alpha$) for $f_C \angle 0°$ and (cos $\beta$) · (sin $\alpha$) for $f_C \angle 90°$. The former, (cos $\beta$) · (cos $\alpha$) = ½ [cos ($\alpha + \beta$) + cos ($\alpha - \beta$)], and the latter, (cos $\beta$) · (sin $\alpha$) = ½ [sin ($\alpha + \beta$) + sin ($\alpha - \beta$)]. Thus, two distinct frequencies result at the output of modulator 214, ($\alpha + \beta$) and ($\alpha - \beta$). Retention of both frequencies is vital to operation of the FIG. 2 form of the present invention, whereas previous systems have employed a band pass filter to remove one of these frequencies, leaving the other intact. A considerable advantage results in the FIG. 2 embodiment, however, by retaining both the sum and difference frequencies.

A further double balanced modulator 216 multiplies the quadrature modulated 3.58 MHz chroma signal with extended $f_C$ burst and subjected to automatic gain control by chroma processor 202 by the sum and difference frequencies received sequentially from modulator 214.

The process of multiplication of a quadrature modulated signal with a dual set of carriers themselves consisting of the product of one carrier $\beta$ and a sequential set of quadrature component of the signal carrier result in a carrier $\beta$ sequentially amplitude modulated. On blue line:

$$(U \cos \alpha + V \sin \alpha) \tfrac{1}{2} (\cos (\alpha + \beta) + \cos (\alpha - \beta))$$
$$= U \tfrac{1}{2} (\cos \beta + \cos (-\beta)) + U \tfrac{1}{2} [\cos (2\alpha + \beta) + \cos (2\alpha - \beta)] + V \cdot \tfrac{1}{2} (\sin \beta + \sin (-\beta)) + V [\tfrac{1}{2} \sin (2\alpha + \beta) + \sin (2\alpha - \beta)] = U \cos \beta + \text{terms about } 2\alpha \pm \beta$$

which are removed by low pass filter.
On red line:

$$(U \cos \alpha + V \sin \alpha) \tfrac{1}{2} (\sin (\alpha + \beta) + \sin (\alpha - \beta)) = V \cdot \tfrac{1}{2} (\cos \beta + \cos (-\beta)) + V \tfrac{1}{2} [\cos (2\alpha - \beta) - \cos (2\alpha + \beta)] + U \tfrac{1}{2} (\sin \beta + \sin (-\beta)) + U \tfrac{1}{2} [\sin (2\alpha + \beta) + \sin (2\alpha - \beta)] = V \cos \beta + \text{terms about } 2\alpha + \beta$$

which are removed by a low pass filter.

The output of modulator 216 then gives at a given horizontal line only one of the two chroma components, either the blue (U) component or the red (V) component, depending on whether the input to modulator 214 is cos$\alpha$ or sin$\alpha$ at that time. The output of modulator 216 therefore comprises line-sequential U and V chroma component information modulated on the transfer channel subcarrier $f_T$. Note that the chroma signal is not converted to baseband but is instead directly translated from broadcast frequency to transfer channel frequency, and that the extended $f_C$ burst is also directly translated to an $f_T$ burst in the process. The output of modulator 216 goes to a low pass filter 218 for removing unwanted modulation products at $2\alpha \pm \beta$, leaving only the alternating horizontal line chroma components U·cos $\beta$ and V · cos$\beta$. These components are thus modulated on the $f_T$ carrier at the same phase angle, because of the fact that $f_C$ was phase switched at 208. The line sequential chroma information modulated at the $f_T$ frequency and having the extended burst (now at $f_T$ due to conversion from $f_C$ along with the chroma information in modulator 216) is presented to summing amplifier 156 to complete the composite transfer channel format signal.

Both double balanced modulators 214 and 216 may be of type SL 1596, available from Plessey Microsystems of Santa Ana, California, or equivalent. It is important to note that in the direct translation of chroma signal format in the FIG. 2 arrangement the use of double balanced modulation results in inherent suppression of the transfer channel chroma subcarrier $f_T$ and of all modulation products other than the sum and difference frequencies of the signals appearing at the modulators input ports. As a result, cross-modulation of the AM chroma with the FM luma in the transfer channel less of a problem than in prior art systems.

Upon retrieval of the composite signal from the transfer channel the chroma portion is separated by band pass filter 220. The $f_T$ extended burst is taken off by means of a gate 221 switched by the horizontal blanking pulse BK for use in time base error correction, if needed. Numerous schemes for such correction are known in the art and the method of effecting such correction is not a part of the present invention. A further gate 224 is switched at $\overline{BK}$, the inverse of BK, to produce the line sequential chroma information modulated at $f_T$. Phase compensator 226 adjusts the modulated chroma signal for phase shifts induced by filters 218 and 220, and a single multiplier 222, supplied with the ($\alpha + \beta$) and ($\alpha - \beta$) components from modulator 214, translates the modulated chroma information back to the $f_C$ subcarrier frequency.

A summing amplifier 225 receives the broadcast frequency chroma as well as the chroma burst of $f_C 0°$ to restore the broadcast format chroma signal portion. For NTSC the $f_C$ chroma burst is produced by dividing the horizontal line frequency $f_H$ by two in divider 227 and gated with a burst flag BF signal from a sync processor 113 to produce an NTSC blue line identification signal BI which gates the $f_C$ reference from chroma processor 202 at 230 to give the proper length $f_C$ burst on each blue line, and stored in delay line 234 for insertion on the red line. Since multiplier 222 provides both sum and difference frequencies to summing amplifier 225, a band pass filter 232 is included to give only the desired U · cos $\alpha$ and V · sin $\alpha$ components in line sequential form. Delay line 234 and summing amplifier 236 restore fully the NTSC format chroma signal so that summing amplifier 180 gives the composite NTSC format video signal.

A further inherent advantage of the translating circuitry of FIG. 2 is that time base error introduced by the transfer channel is not translated into phase error, but into amplitude modulation, which makes the system highly useful for magnetic tape and disc recorders, for example. The following mathematical analysis shows how the encoded transfer channel signal converts the time base error into amplitude modulation which can be compensated by means of conventional automatic gain control means employing the phase of the burst for level reference.

The output of the multiplier 222 comprises a number of sum and difference frequencies as a result of the mixing of $\beta$, ($\alpha + \beta$) and ($\alpha - \beta$) frequencies. One of the output frequencies is $\alpha$ and this is the one desired. Two sidebands at center frequencies $\alpha - 2\beta$ and $\alpha + 2\beta$ also result, but are eliminated by a bandpass filter 232. In playback a time base error exists in the signal from the transfer channel in the form of a small frequency shift added to the transfer channel chroma subcarrier. The playback signal is thus:

$$U \cdot \cos (\beta + \epsilon_1) \text{ for red lines}$$

V · cos (β + ε₂) for blue lines

Note that the error may be different from one line to the next, as indicated by different subcripts on ε. Multiplying the time base error affected signal given above by the output from modulator 214 results in the following for a blue line when switch 208 is providing cos α:

$$U \cos (\beta + \epsilon_1) \cos \beta \cdot \cos \alpha \quad (1)$$

$$= U \cdot \cos \alpha \,[\cos \beta \cdot \cos (\beta + \epsilon_1)] \quad (2)$$

$$= U \cdot \cos \alpha \cdot \tfrac{1}{2} [\cos (2\beta + \epsilon_1) + \cos \epsilon_1] \quad (3)$$

$$= \tfrac{1}{2} \cdot U \cdot \cos \alpha \cdot [\cos \epsilon_1 + \cos (2\beta + \epsilon_1)] \quad (4)$$

Band pass filter 232 selectively removes the cos (2β + ε₁) term of the line (4) equation (2 β being twice the transfer channel subcarrier frequency and ε₁ being relatively small), leaving only the (½ U cos ε₁) · (cos α) term on the blue line. This term represents B-Y information modulated at the correct α frequency and phase angle, but amplitude modulated by cos ε₁. Further analysis shows the output of filter 232 to be ½ V · sin α · cos ε₂ for the red line, indicating that the R-Y information modulated at the correct frequency and phase angle is amplitude modulated by cos ε₂. Since chroma information is carried by the phase angle of the NTSC signal, it is crucial to have time base error caused by the transfer channel appearing only as amplitude modulation in the restored NTSC broadcast format signal. This inherent result of the present invention represents a distinct advantage over many prior art arrangements.

Another result is that the output burst at $f_C$ is produced at correct phase not disturbed by time base error. This permits the phase lock circuit of a television receiver to remain in lock without producing objectionable color-streaking in the reproduced playback picture.

It has been found by the inventor that non-linearities in the recording medium may cause some FM cross-talk of the chroma carrier $f_T$ in the FM luma signal should the signal levels be too large. The suppressed carrier AM chroma format reduces the visibility of such cross-talk which appears as an objectionable interference pattern in the TV picture display. Interlacing line-to-line of the cross-talk by reversing polarity of the chroma carrier each horizontal line is ineffective to remove the dot pattern because of the bisequential nature of the chroma signal, since the cross-modulation into luma comprises red information on one horizontal line and blue on the next. Interlacing line-to-line requires that the adjacent lines have substantially the same signal content but with opposite polarity. Furthermore, the inventor has found that the most visible component of the dot pattern is at twice the chroma carrier frequency, or $2 \cdot f_T$.

As a result, it has been found advantageous to alternate the polarity of the chroma carrier from horizontal line pair to horizontal line pair as well as from picture frame pair to picture frame pair. This can be accomplished by switching the chroma carrier polarity at ½ · $f_H$ so that the spectrum of the chroma carrier is $f_T = [n + 1/8] \cdot f_H \pm \tfrac{1}{4} f_H$, where n is an integer. If it is considered that the picture display contains 525 lines per frame for NTSC and PAL-M (or 625 lines per frame for PAL-B), the 2 $f_T$ interference interlace will occur over 8 vertical fields (4 picture frames). Thus two adjacent frames will have interference of one polarity and the next two frames will have interference of opposite polarity on the corresponding scan lines. The visual impression of the above-mentioned interference will be thereby averaged due to the viewer's persistence of vision.

FIG. 3 illustrates a modification of the signal translating circuitry of FIG. 2 for providing the interlace effect just described. The modification includes, first, means for inverting the polarity of the transfer channel chroma carrier every two lines and, second, means for inserting in the luma signal a pulse every fourth line to assure proper phasing of the switched transfer channel chroma carrier used for retranslation of chroma to the broadcast format.

The transfer channel chroma carrier may be polarity switched by means of a divider-by-two 300 and an additional double balanced modulator 302. Divider 300 receives the ½ · $f_H$ reference from divider 227 and supplies to one input port of modulator 302 a reference at frequency ¼ $f_H$. Modulator 302 receives at a second input port the output of a modulator 214, $f_C \pm 65/2 \cdot f_H$, which was supplied in the FIG. 2 circuit directly to modulator 216. At an output, modulator 302 gives the sum and difference of the frequencies at its inputs, namely $f_c \pm 65/2 \cdot f_H \pm \tfrac{1}{4} \cdot f_H$, and supplies these sum and difference frequencies to modulator 216. Direct translation of the chroma information in modulator 216 occurs as was described with reference to FIG. 2, except that the transfer channel chroma modulation spectrum now comprises frequencies at $65/2 \cdot f_H \pm \tfrac{1}{4} \cdot f_H \cdot \pm (2m+1) \tfrac{1}{2} f_H$, where m is an integer.

The switched chroma carrier has no effect on the chroma information when restored to broadcast format, so long as the chroma carrier reference used to restore the chroma information to broadcast format is also switched. However, any crosstalk of chroma into luma in the transfer channel will be affected, and will appear with alternating polarity on adjacent line pairs, so that the visibility of a chroma carrier frequency pattern in the picture display will be considerably reduced. Since NTSC and PAL-M receivers display 525 horizontal lines per frame and PAL-B receivers display 625 lines per frame (neither 525 nor 625 being an integral multiple of 4), the chroma cross-talk into luma will average every 4 picture frames. Thus, interlacing which reduces the visibility of the cross-talk into luma in the picture display occurs not only from line pair to line pair but also from frame pair to frame pair.

FIG. 3 further shows means for inserting an identifying pulse in the luma signal every fourth line so that the chroma carrier reference supplied to multiplier 222 may be maintained in phase with the modulated chroma information from the transfer channel. The identifying pulses are produced by supplying to respective inputs of a gate 304 the ¼ $f_H$ reference from divider 300 and the BI pulse from gate 228. Switch 306, in the "R" position during translation to transfer channel format, then provides a chroma interlace identification pulse each fourth line to a summing amplifier 308. The chroma identification pulse is essentially the same as the conventional BI pulse except that it occurs only half as often. Amplifier 308 then inserts the chroma identification pulse into the transfer channel luma signal.

Upon retrieval of the composite signal from the transfer channel, sync processor 113 removes the chroma identification pulses and supplies them to dividers 227 and 300 on the lines marked ID for proper phasing with the retrieved signal. The output of the multiplier is then chroma information modulated at $f_c$. The BI pulses are restored in the NTSC signal by sync processor 113, switch 306 being in the "P" position for retranslation of the signal to NTSC format.

Figure 4:
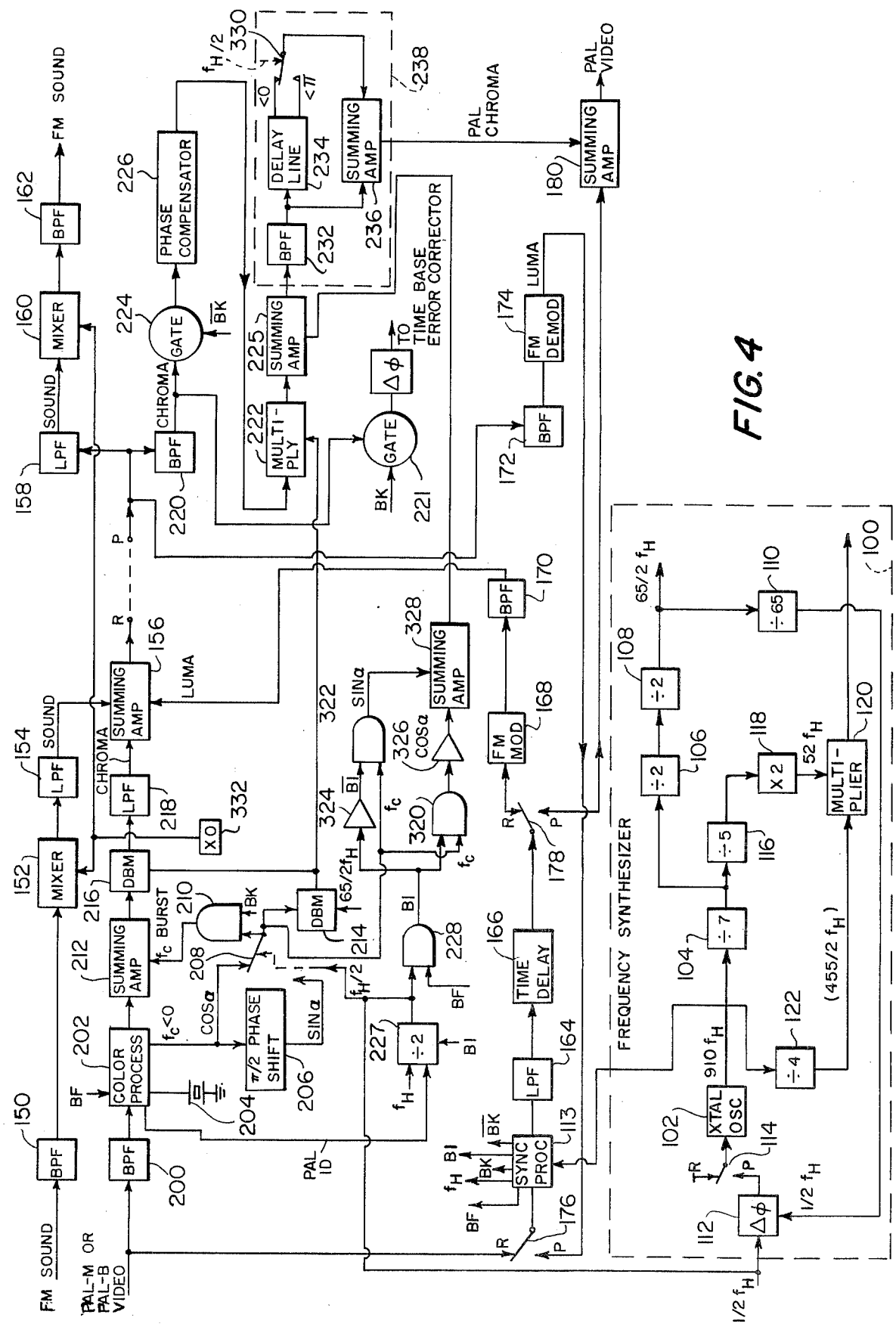
FIG. 4 shows a further modification of the FIG. 2 arrangement for enclodiing of a PAL color video signal.

FIG. 4 shows a further modification of the FIG. 2 arrangement for use with PAL-B or PAL-M broadcast signals and television receivers. It is important to note that only minor circuit changes are necessary for use with PAL signals. Although NTSC and PAL are both quadrature color signal formats, the NTSC color signal given by U cosα + V · sin α the PAL color signal given by U cosα ± V sin α, the sign being + or − on alternate lines for "PAL." This means that the polarity of the R-Y information is alternated line-to line for PAL.

For translation from PAL-B or PAL-M to transfer channel format, switch 208 must be synchronized with the red line polarity of the incoming PAL signal to give sin α when V · sin α is positive. This may be done by synchronizing divider 227 with the conventional PAL identification signal (PAL ID) from color processor 202. Translation of the transfer channel signal back to PAL-B or PAL-M format further requires that the polarity of the $f_c$ chroma burst to summing amplifier be properly phased. To accomplish this, gate 230 of FIG. 2 is replaced with a network comprising gates 320 and 322, inverters 324 and 326, and a summing amplifier 328. On retrieval of the transfer channel signal from the channel, the blue line identification signal (BI) from gate 228 is passed to one input of gate 320 and to inverter 324, inverter 324 in turn providing a red line identification signal $\overline{(BI)}$ to one input of gate 322. The remaining inputs of gates 320, 322 are connected to switch 208. Because switch 208 is phased with the transfer channel signal by divider 227, gate 322 willgive an output of sin α during the burst interval on the next line. Gate 320 is followed by an inverter 326 so that the output signal of amplifier 328 comprises (sin α) on red lines and cos (α + π) on blue lines during the burst interval.

The output of amplifier 225 then comprises in sequence a burst of cos (α + π), a line of (B−Y) · cos α, a burst of sin α and a line of (R−Y) · sin α. The sequence then repeats. After filtering at 232 the sequence is submitted to a network comprising delay line 234 which has an additional, inverting output, a switch 330 operated at frequency ½ $f_H$ from divider 227, and a summing amplifier 236. When amplifier 236 receives a red line [(R−Y) · sin α] with [sin α] burst from filter 232 it also receives, one line delayed, a blue line [(B−Y) · cos α] with [cos (α + π)] burst from switch 330; but when amplifier 236 next receives a blue line [(B−Y) · cos α] with [cos (α + π)] burst from filter 232 it also receives, one line delayed, an inverted red line [− (R−Y) sin α] with an inverted [−sin α] burst. The output of amplifier 236 is thus quadrature modulated chroma, amplitude modulated at $f_c$ with the polarity of the red signal (R−Y) alternating line-to-line, and of course, suppressed carrier $f_c$.

A further modification necessary for use of the FIG. 2 arrangement for PAL-B signals results from the use of a different FM audio carrier frequency in PAL-B. The PAL-M format uses a 4.5 MHz sound carrier as for NTSC. However, PAL-B utilizes 6.5 MHz, 6 MHz or 5.5 MHz in different areas of the world. As a result, the heterodyning reference to mixers 152, 160 is shown originating from a crystal oscillator 332 in FIG. 4. Since it is desireable to maintain the transfer channel carrier at the same frequency regardless of the source of broadcast signals in order to assure international compatibility, the frequency from oscillator 332 must be related to the broadcast signal source. If the transfer channel FM audio carrier is to be, for example, 102 KHz, the crystal oscillator frequency must be equal to the broadcast frequency audio carrier ± 102 KHz.

Further modifications of the direct chroma translation circuitry of FIGS. 2-4 within the scope of the invention will be apparent to those skilled in the art. For example, the interlacing modification of FIG. 3 may be made in the arrangement of FIG. 4. Furthermore, the PAL-B/PAL-M variation of FIG. 4 may be incorporated in the NTSC system of FIG. 2 with appropriate switches so that a single circuit arrangement could be switched for use with NTSC, PAL-B or PAL-M broadcast signals and TV receivers.

Figure 5:
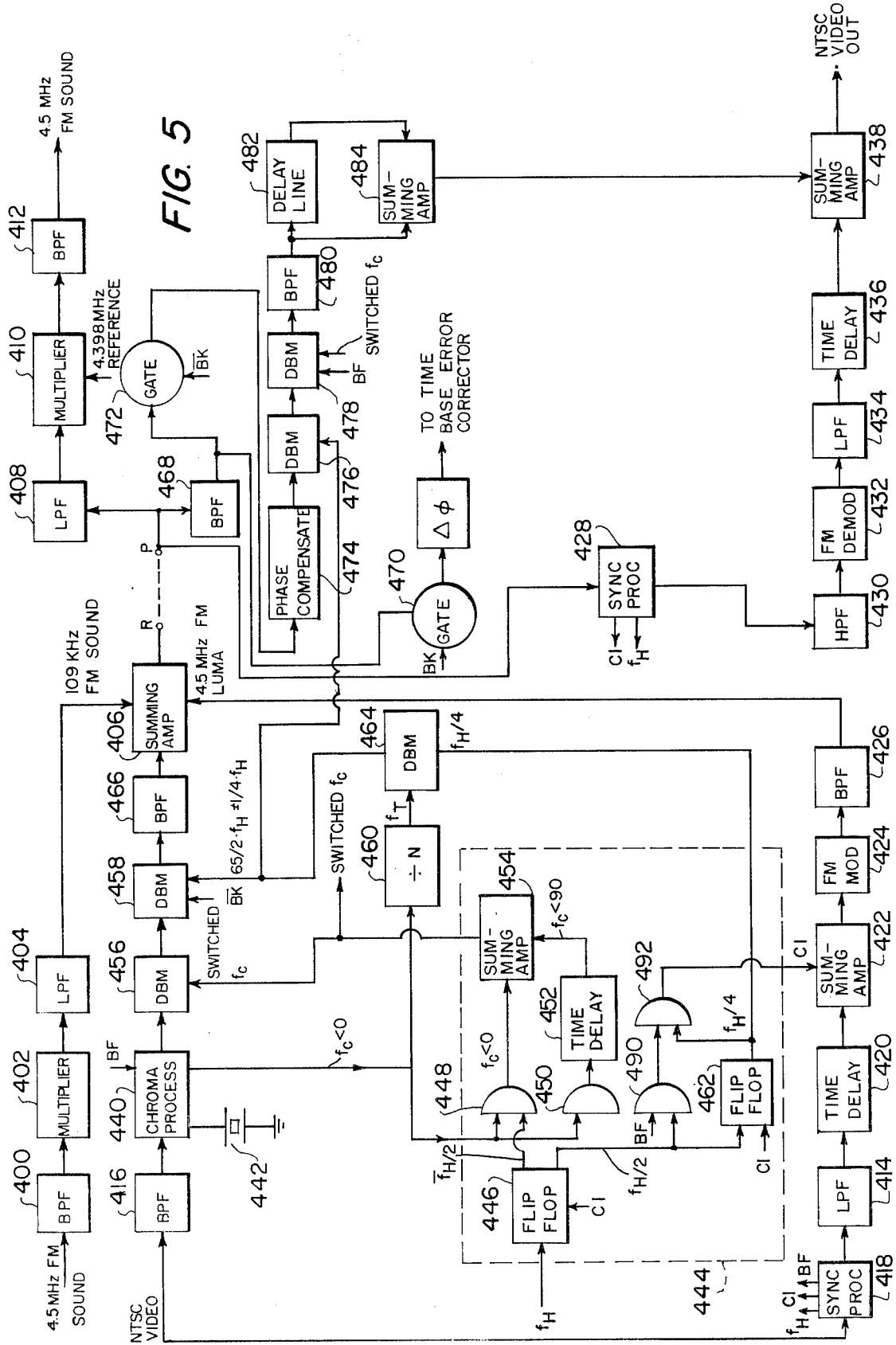
FIG. 5 shows a second arrangement for encoding an NTSC color video signal according to the present invention.

A further embodiment of the present invention is shown in FIG. 5 wherein an NTSC broadcast format signal is translated to the transfer channel format in a somewhat different fashion than in FIG. 2. In the FIG. 5 arrangement the 4.5 MHz FM broadcast sound is filtered, mixed with a 4.398 MHz or 4.602 MHz reference signal and refiltered at 400, 402, 404, respectively. The resulting transfer channel format sound signal FM modulated at 102 KHz is supplied to summing amplifier 406 for insertion into the tape channel. Upon retrieval from the transfer channel, the 102 KHz FM sound signal is separated by low pass filter 408, mixed with the 4.62 MHz reference in multiplier 410 and bandpass filtered at block 412 to restore the 4.5 MHz FM sound.

The NTSC composite video signal is split into luma and chroma components by low pass and band pass filters 414 and 416, respectively. As with the FIG. 2 arrangement, the luma signal is passed through a sync processor 418 and time delayed at 420 to account for the longer time needed for chroma processing. However, a summing amplifier 422 is inserted prior to the luma FM modulator 424 for inserting the chroma interlace identifying pulses CI as will be detailed further below. The FM modulated luma signal is band pass filtered at 426 and sent to the summing amplifier 406. Upon retrieval from the transfer channel, the luma signal is passed through sync processor 428 and filter 430, demodulated to baseband at 432, and sent through filter 434 and time delay 436 to summing amplifier 438. Sync processors 418, 428 may be of conventional type.

The chroma portion of the split NTSC signal from filter 416 goes to the chroma processor 440, which may be a Fairchild Model uA787 or equivalent integrated circuit. Crystal 442 provides the necessary $f_c$ reference (3.58 MHz for NTSC), and processor 440 gives outputs of $f_c \angle 0°$ and 3.58 MHz AM suppressed carrier quadrature chroma. A digital circuit block 444 then provides signals for further processing of the chroma signal. The horizontal line frequency $f_H$ from sync processor 418 is supplied to flip-flop 446 which gives complementary outputs of $f_H/2$ and $f_H/2$ to logic gates 448, 450, respectively. Gates 448, 450 also receive the $f_C \angle 0°$ subcarrier from processor 440 so that the $f_C \angle 0°$ subcarrier appears alternately at the respective gate outputs. Time delay 452 imparts a 90° phase shift to the output of gate 450 and the resultant $f_C \angle 90°$ signal is summed with the $f_C \angle 0°$ signal at amplifier 454 for use in demodulating to baseband the chroma signal from processor 440.

The result of using phase switched subcarrier $f_C$ at double balanced modulator 456 is an output therefrom which comprises line-sequential, baseband chroma. Note that the effect of modulator 456 is to alternately multiply one line of the U cos α + V sin α chroma signal (α being $2\pi f_C t$) by cos α, and the next by sin α. For cos α, the result is ½ U + ½ U cos 2α + ½ V sin 2 α, and for sin α the result is ½ U sin2α + ½ V + ½ V cos 2α. The output from modulator 456 is therefore baseband R−Y and B−Y information on alternate lines, with additional components at twice the $f_C$ subcarrier frequency. Double balanced modulator 458 then remodulates the line-sequential baseband chroma on the transfer channel carrier, using a reference which is preferably switched at one fourth the horizontal line frequency $f_H$, so that interlace of the chroma crosstalk into luma occurring in the transfer channel will result as in FIG. 3, above.

To produce the switched chroma carrier reference for modulator 458, the $f_C \angle 0°$ reference is first divided by the appropriate value N in divider 460 to give the desired transfer channel chroma subcarrier frequency. For purposes of the present discussion it will be assumed that $f_C = 3.58$ MHz and $f_T = 65/2 f_H$. While such frequency choice is exemplary, it will be understood that any suitable values may be selected without departing from the spirit and scope of the present invention.

The $f_H/2$ output of flip-flop 446 goes to a further flip-flop 462 which gives an output signal of $f_H/4$. Double balanced modulator 464 receives both the $65/2\ f_H$ and $f_H/4$ signals and gives to modulator 458 a chroma carrier which changes polarity every two lines. Thus, the chroma carrier contains two frequencies, $65/2 \cdot f_H + \frac{1}{4} \cdot f_H$ and $65/2 \cdot f_H - \frac{1}{4} \cdot f_H$. Modulator 458 also receives the horizontal blanking signal BK. The output of modulator 458 comprises line-sequential chroma information during the intervals between horizontal blanking pulses and amplitude modulated at with suppressed carrier, each pair of R−Y and B−Y lines being of opposite polarity with respect to the adjacent pair as well as a chroma carrier burst during each blanking interval. As is known in the art, unbalancing the double balanced modulator 458 with a blanking pulse BK will result in an output the frequency of which equals the $f_T$ carrier, even if no chroma is present. The output signal from modulator 358 is filtered at 466 to pass only the desired modulation components deleting such components as the $2 \cdot f_C$ frequencies resulting from modulator 456) and sent to summing amplifier 406 to complete the signal conversion to transfer channel format.

On retrieval of the composite signal from the transfer channel and chroma signal is isolated by band pass filter 468 and gated at 470 with the horizontal blanking signal to separate the $f_T$ chroma subcarrier burst for use in a suitable time base error corrector, if needed. The chroma signal is also gated at 472 with the inverse horizontal blanking signal $\overline{BK}$, giving only the line sequential AM chroma information to phase compensator 474. The chroma signal is then demodulated to baseband by double balanced modulator 476 and remodulated at the $f_C$ frequency by double balanced modulator 478. By providing the burst flag signal BF to unbalance modulator 478 during the burst interval, the NTSC chroma subcarrier burst is restored along with the NTSC format chroma. Band pass filter 480 removes undesired modulation components. A delay line 482 and summing amplifier 484 complete restoration of AM quadrature chroma, and amplifier 438 gives the completed NTSC format video signal.

An added point of interest is the generation of chroma interlace identification pulses CI in the transfer channel signal, such pulses being necessary just as in the FIG. 3 embodiment for assuring proper phasing of the switched transfer channel chroma carrier to modulator 476. During translation to transfer channel format, the conventional burst flag BF reference from sync processor 418 is supplied to one input of logic gate 490 and the $f_H/2$ signal from flip-flop 446 is supplied to a second input of gate 490. The result is a burst flag pulse occurring every second horizontal line at the output of gate 350. This line-alternating BF signal is switched again at gate 492 by frequency $f_H/4$ to produce a chroma identification CI pulse every fourth horizontal line. Amplifier 422 inserts the CI pulses into the luma channel.

Upon retrieval of the composite signal from the transfer channel, sync processor 428 removes the CI pulses from the luma signal and synchronizes flip-flops 446, 462 therewith. By this means, the phase of the switched transfer channel carrier reference to modulator 476 is oriented to assure proper demodulation of the chroma signal.

Figure 6:
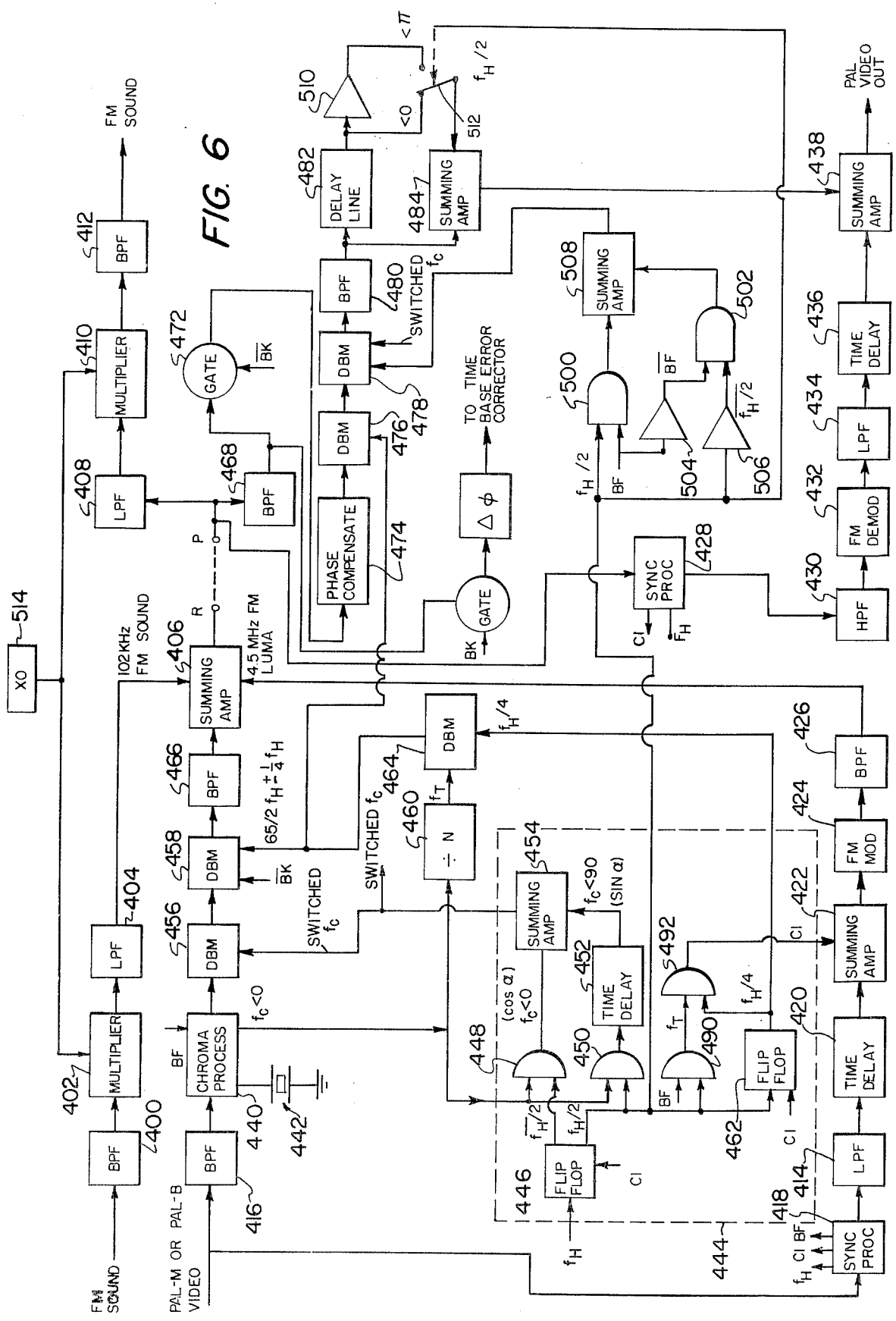
FIG. 6 shows a modification of the FIG. 5 arrangement for encoding of a PAL color video signal.

A modification of the FIG. 5 arrangement for use with PAL-B or PAL-M signals is shown in FIG. 6. Translation of chroma and luma information to transfer channel format is accomplished for PAL by the same circuitry as for NTSC. However, a network comprising gates 500, 502, inverters 504, 506, and summing amplifier 508 is required to assure proper translation to PAL format of the transfer channel signal. Gate 500 receives the $f_H/2$ and burst flag BF (from sync processor 418) signals and gives a pulse of positive polarity in the burst flag interval on the blue information lines. Gate 502 receives the $f_H/2$ signal from inverter 506 and the $\overline{BF}$ signal from inverter 504, and gives a pulse of negative polarity in the burst flag interval on the red information lines. As a result, modulator 478 is unbalanced during the burst intervals by the pulses of opposite polarity on alternating lines. The signals at the output of modulator 478 comprise, in sequence, a burst of cos (α + π), a line of (B−Y) · cos α, a burst of sin α, and a line of (R−Y) · sin α. The sequence then repeats. After filtering at 480, the sequence is restored to PAL quadrature format by delay line 482, summing amplifier 484, inverter 510, and switch 512 operated at $f_H/2$, as described with reference to FIG. 4 above.

A further modification of the FIG. 5 arrangement shown in FIG. 6 lies in the sound channel. Crystal oscillator 514 provides a reference at, for example, 102 KHz away from the carrier of the incoming FM sound signal. Heterodyning of the FM sound to and from a 102 KHz carrier is therefore accomplished in multipliers 402, 410, respectively. It will be understood that the differences in circuitry needed to change the FIG. 5 arrangement for NTSC to the FIG. 6 arrangement for PAL-B or PAL-M may be made by appropriate arrangement of switches to change the circuit from one arrangement to the other.

Figure 7:
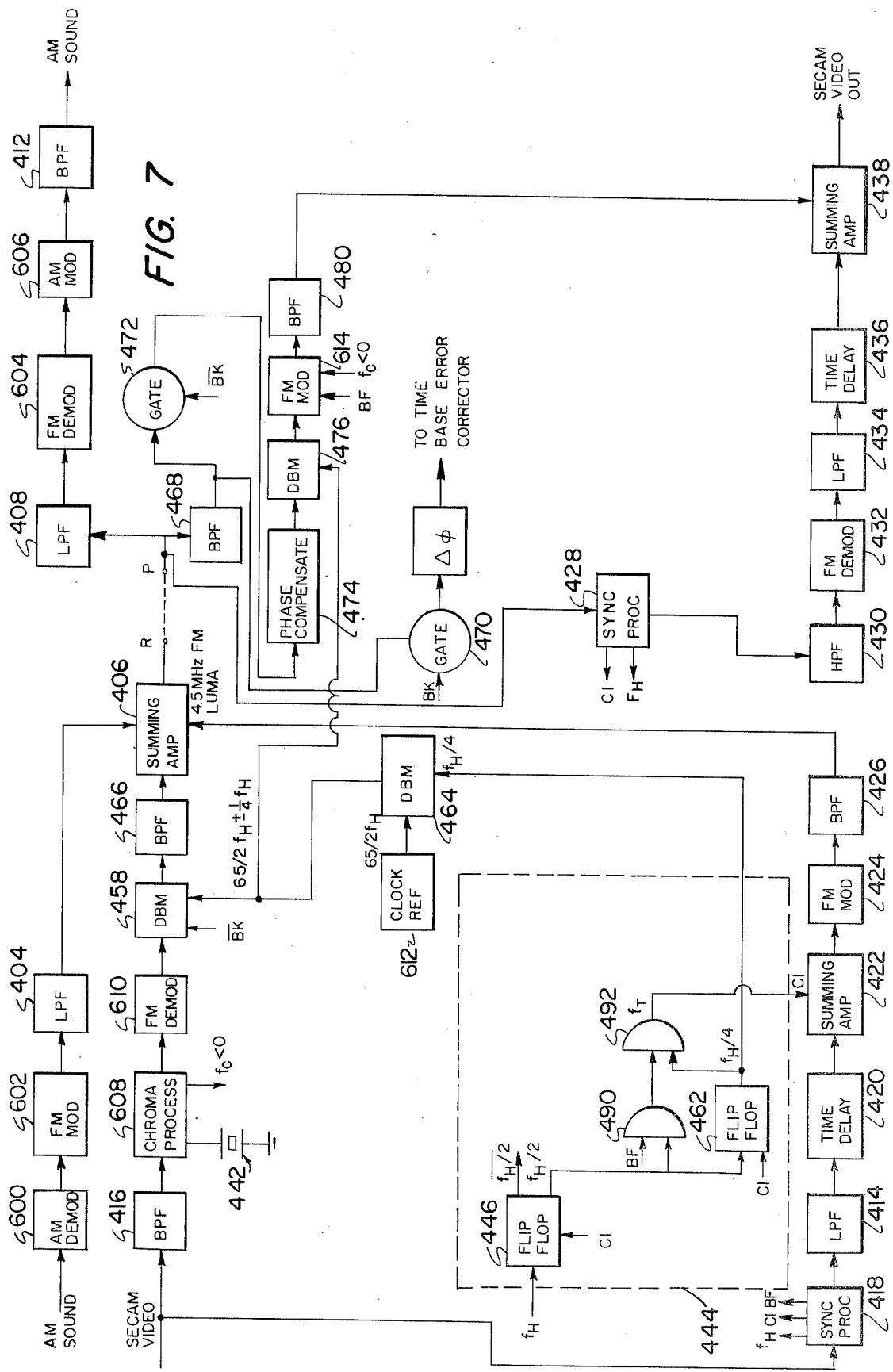
FIG. 7 shows a further modification of the FIG. 5 arrangement for encoding a SECAM color video signal.

Yet another modification of the FIG. 5 arrangement may be made to allow translation of SECAM format signals to the transfer channel format as shown in FIG. 7. Processing of luma information in FIG. 7 is the same as for FIGS. 5 and 6. However, sound and chroma information is handled somewhat differently. Sound information for SECAM is amplitude modulated and must be demodulated to baseband by amplitude demodulator 600 and remodulated by frequency modulator 602 at, for example, 102 KHz before going through filter 404 to the transfer channel. To restore SECAM sound, the transfer channel FM sound is filtered, frequency demodulated to baseband at 604 and amplitude modulated at 606.

The chroma information for SECAM differs from NTSC, PAL-B and PAL-M in that it comprises frequency modulated line-sequential color difference (R−Y, B−Y) signals rather than quadrature-modulated AM suppressed carrier color difference signals. Since the output of chroma processor 608 comprises line sequential chroma, all that need be done to arrive at the transfer channel format is to frequency demodulate at demodulator 610 and amplitude modulate with suppressed carrier in double balanced modulator 458 using a reference such as $65/2 \cdot f_H \pm \frac{1}{4} f_H$. Modulator 464 may be supplied with a reference of $65/2\ f_H$ from a crystal controlled clock reference 612, as well as the $f_H/4$ reference from flip-flop 462 as shown. Restoration of SECAM chroma requires only that after reduction to baseband in modulator 476, the line sequential chroma be frequently modulated in modulator 614. The SECAM chroma subcarrier $f_C$ for modulator 614 may be obtained from the crystal controlled source at chroma processor 608.

It will be seen that the transfer channel signal produced by the above described arrangements may be made independent of the source (NTSC, PAL-B, PAL-M, SECAM) of the color video information content. Once the transfer channel format is attained, any of the mentioned broadcast formats may be obtained therefrom by means of an appropriate one of the above circuits.

Regardless of which of the above circuit arrangements is used to arrive at the transfer channel signal format of the present invention, further beneficial side effects are present when the transfer channel is a magnetic recording medium. First, the audio information may be recorded at a lower frequency band of the transfer channel, in which case the audio FM signal is automatically attenuated approximately 6 dB/octave with respect to the chroma signal. It is known that when a signal recorded on a magnetic medium with constant current is played back using a magnetic transducer, the playback signal gain increases substantially linearly with frequency at 6 dB/octave up to a frequency which is a function of the transducer gap width and relative transducer-to-medium velocity.

For the carrier frequencies of 102 KHz for audio and 511 KHz for chroma assumed above, the audio carrier is slightly more than 2 octaves below the chroma carrier and the audio carrier frequency is suppressed approximately 14 dB relative to the chroma carrier frequency for comparable level record signals. As a result, the need for sound carrier filtering in the chroma channel is correspondingly reduced.

The 6 dB/octave gain in the chroma band further aids in demodulation of the chroma transfer channel by attenuating the lower frequency chroma sideband and eliminating chroma bandwidth problems which may otherwise follow from the choice of such a low frequency chroma carrier. For example, if the lower sideband width is greater than the chroma carrier frequency, the lower sideband frequencies will go below zero. Such "negative" frequencies will fold over about zero to give beats. Consider a chroma carrier frequency of 500 KHz and lower and upper sidebands of 600 KHz each. Without suppression of the lower sideband, beats would occur at 400 KHz, 100 KHz from the carrier. Suppressing the lower sideband at 6 dB/octave eliminates such beats. Thus, the upper chroma sideband may extend up to 1.1 MHz even with a 500 KHz carrier.

Since the 6 dB/octave gain is often linear to frequencies well above 1.1 MHz (depending on gap width and velocity), an upper sideband wider than 600 KHz is possible. In fact, the upper chroma sideband in a magnetic medium system can be extended as far as could be reasonably needed for good picture quality, so long as it does not interfere with the luma signal bandwidth. Therefore, the chroma frequency bandwidth with the present invention is limited only by the choice of the FM luma carrier frequency and the FM luma bandwidth.

Those skilled in the art will recognize from the foregoing detailed description of the preferred embodiments that numerous additional modifications may be made within the spirit and scope of the invention. Such embodiments are indended only to be exemplary, the scope of the invention being defined by the claims which follow.

I claim:

1. A method of processing a color video signal in which quadrature modulated chroma information amplitude modulated at a first carrier frequency is translated to bisequential chroma information amplitude modulated at a second carrier frequency with suppressed carrier, comprising the steps of:
   (a) separating a signal representing said amplitude and quadrature modulated chroma information from said color video signal;
   (b) applying said separated chroma information signal to one input of a first double balanced modulator;
   (c) switching the phase of a reference source of said first carrier frequency alternately between zero degrees and ninety degrees from one horizontal video scan line to the next;
   (d) mixing said phase switched first carrier reference with a reference source of said second carrier frequency to produce a signal comprising the sum and difference frequencies of said phase switched first carrier and said second carrier; and
   (e) applying said sum and difference frequency signal to a second input of said first double balanced modulator, whereby the output signal of said first double balanced modulator represents chroma information bisequentially amplitude modulated at said second carrier frequency with suppressed carrier.

2. The method of claim 1, wherein the step of mixing said phase switched first carrier with said second carrier comprises double balanced modulation.

3. The method of claim 1 further comprising the step of inserting in the blanking interval of at least one horizontal video scan line of said amplitude modulated quadrature chroma information signal a burst of said first carrier frequency prior to supplying said amplitude modulated quadrature chroma information signal to said first double balanced modulator, whereby the output signal of said first double balanced modulator contains a corresponding burst of said second carrier frequency due to frequency translation of said first carrier frequency burst.

4. The method of claim 1, further comprising the steps of separating a luma information signal from said color video signal and frequency modulating said luma information signal at a third carrier frequency, said third carrier frequency being selected so that sidebands of the frequency modulated luma signal will not appreciably interfere with sidebands of said bisequential chroma signal amplitude modulated with suppressed carrier.

5. The method of claim 4, further comprising the steps of additively combining said frequency modulated luma signal with said bisequential chroma signal amplitude modulated with suppressed carrier.

6. The method of claim 4, wherein said third carrier frequency is substantially higher than said second carrier frequency.

7. The method of claim 1, wherein said second carrier frequency is an odd multiple of one half the horizontal video line scan frequency.

8. The method of claim 4, wherein said color video signal is accompanied by an audio information signal, further comprising the steps of
supplying said audio information signal frequency modulated at a fourth carrier frequency; and
additively combining said frequency modulated audio signal with said frequency modulated luma signal and said bisequential chroma signal amplitude modulated with suppressed carrier, said fourth carrier frequency being selected so that sidebands of the frequency modulated audio signal will not appreciably interfere with sidebands of the signals with which it is additively combined.

9. The method of claim 1, further comprising the step of submitting said bisequential chroma signal amplitude modulated with suppressed carrier to a transfer channel.

10. The method of claim 9, wherein said transfer channel comprises a recording medium.

11. The method of claim 1, further comprising the step of submitting said bisequential chroma signal amplitude modulated with suppressed carrier to a transfer channel subject to time base error.

12. The method of claim 1, wherein said color video signal includes a synchronizing pulse in at least some horizontal video scan lines, further comprising the steps of separating said synchronization pulses from said color video signal and synchronizing the phase switching of said first carrier frequency reference with said synchronizing pulses, whereby the first carrier frequency reference is at 0° when a blue (B−Y) line of chroma information is to appear at the output of said first double balanced modulator and at ninety degrees when a red (R−Y) line of chroma information is to appear at the output of said first double balanced modulator.

13. The method of claim 1, further comprising the step of alternating the polarity of said second carrier reference on adjacent pairs of horizontal video scan lines prior to mixing with said phase switched first carrier reference, whereby the output signal of said first double balanced modulator has carrier polarity alternating on adjacent pairs of horizontal video scan lines and the modulation sideband frequencies comprise odd multiples of one quarter the horizontal scan line frequency.

14. The method of claim 13, further comprising the steps of generating a marker signal indicative of the phase of said alternating polarity carrier and combining said marker signal with said bisequential chroma information.

15. The method of claim 1, wherein said color video signal is a National Television Systems Committee format signal.

16. The method of claim 1, wherein said color video signal is a Phase Alternating Lines format signal.

17. A method of processing a color video signal, in which bisequential chroma information amplitude modulated at a second carrier frequency with suppressed carrier is translated to quadrature modulated chroma information amplitude modulated at a first carrier frequency, comprising the steps of:
(a) separating said bisequential chroma signal amplitude modulated with suppressed carrier from said color video signal;
(b) applying said separated chroma information signal to one input of a multiplier;
(c) switching the phase of a reference of said first carrier frequency between zero degrees and ninety degrees on adjacent horizontal video scan lines;
(d) mixing said phase switched first carrier reference with a reference of said second carrier frequency to produce a signal comprising the sum and difference frequencies of said phase switched first carrier and said second carrier;
(e) applying said sum and difference frequency signal to a second input of said multiplier, whereby the output signal of said multiplier represents bisequential chroma information amplitude modulated at said first carrier frequency with the carrier phase changing between zero and ninety degrees on adjacent horizontal video scan lines;
(f) delaying by one horizontal video scan line the output of said multiplier; and
(g) additively combining the undelayed signal from said multiplier with the line delayed signal, whereby a quadrature and amplitude modulated chroma information signal is produced.

18. The method of claim 17, wherein the step of mixing said phase switched first carrier with said second carrier comprises double balanced modulation.

19. The method of claim 17, further including the step of inserting a burst of said first carrier frequency during the blanking interval of alternate horizontal video scan lines of said multiplier output signal.

20. The method of claim 19, wherein the step of inserting said burst comprises the steps of first producing said burst by gating a reference source of said first carrier frequency synchronously with blanking intervals of said multiplier output signal, and then additively combining said burst with said multiplier output signal.

21. The method of claim 19 wherein the step of inserting said burst comprises the steps of unbalancing a second double balanced modulator to pass said multiplier output signal in the interim between blanking intervals of horizontal video scan lines and further unbalancing said second double balanced modulator to pass said first carrier frequency during the blanking intervals of alternate horizontal video scan lines.

22. The method of claim 17, further including the step of inserting a burst of said first carrier frequency during the blanking interval of each horizontal video scan line of said multiplier outpout signal, the phase angle of said burst being 90° when inserted in a red (R−Y) horizontal video line and being 180° when inserted in a blue (B−Y) horizontal video scan line of said multiplier output signal.

23. The method of claim 22, wherein the step of inserting said burst comprises the steps of first producing a burst signal by gating a phase-switched source of said first carrier frequency synchronously with blanking intervals of said multiplier output signal and then additively combining said burst signal with said multiplier output signal.

24. The method of claim 22, wherein the step of inserting said burst comprises the steps of unbalancing a second double balanced modulator to pass said multiplier output signal in the interim between blanking intervals of horizontal video scan lines and further unbalancing said second double balanced modulator to pass said first carrier frequency with alternating phase angles of 90° and 180° during the blanking intervals of alternate horizontal video scan lines.

25. The method of claim 17 wherein said color video signal is subject to time base error and has a burst of said second carrier frequency in at least some horizontal blanking intervals, further comprising the steps of separating said second carrier frequency bursts from said color video signal and providing said bursts to a time base error corrector.

26. The method of claim 17 wherein in the step of additively combining the undelayed signal from said multiplier and the line delayed signal from said multiplier are 90° out of phase for all horizontal video scan lines, whereby the resulting quadrature and amplitude modulated chroma information signal comprises chroma information in National Television Systems Committee format.

27. The method of claim 17, wherein in the step of additively combining, the line delayed signal is alternated in polarity on adjacent horizontal video scan lines and the undelayed signal is at constant phase angle, whereby the resulting quadrature and amplitude modulated chroma information signal comprises chroma information in Phase Alternating Lines format.

28. The method of claim 17, wherein said bisequential chroma information amplitude modulated at a second carrier frequency with suppressed carrier has its carrier polarity alternated every two horizontal video scan lines and said video signal has a marker signal indicating the phase of such polarity alternation, further comprising the step of alternating the polarity of the second carrier frequency reference supplied to said multiplier synchronously with said marker signal, whereby the output signal of said multiplier comprises bisequential chroma information amplitude modulated at said first carrier frequency with the carrier phase angle changing between 0° and 90° on adjacent horizontal video scan lines, but with the effect of said second carrier polarity alternation being cancelled.

29. The method of claim 17, wherein said color video signal includes luma information frequency modulated at a third carrier frequency, further comprising the steps of separating the modulated luma information from said color video signal, frequency demodulating said luma information, and additively combining the demodulated luma information signal with said quadrature and amplitude modulated chroma information signal.

30. The method of claim 29 wherein said third carrier frequency is substantially higher than said second carrier frequency.

31. The method of claim 29 wherein said color video signal includes audio information frequency modulated at a fourth carrier frequency; further including the step of separating said audio information from said color video signal.

32. An arrangement for processing a color video signal in which quadrature modulated chroma information amplitude modulated at a first carrier frequency is translated to bisequential chroma information amplitude modulated with suppressed carrier, comprising:
 (a) means for separating from said color video signal a signal representing said amplitude and quadrature modulated chroma information;
 (b) means for producing a reference signal at said first carrier frequency switched in phase between 0° and 90° on adjacent horizontal video scan lines;
 (c) means for producing a reference signal at said second carrier frequency;
 (d) means coupled for mixing said phase-switched first carrier frequency signal and said second carrier frequency signal to produce a signal comprising a sum and difference frequency signal; and
 (e) means coupled for double balanced modulating said sum and difference signal with said quadrature and amplitude modulated chroma information signal, whereby an output signal representing bisequential chroma information amplitude modulated with suppressed carrier is produced.

33. The arrangement of claim 31 wherein said separating means comprises a filter.

34. The arrangement of claim 31, wherein said mixing means comprises a double balanced modulator.

35. The arrangement of claim 31 further comprising means coupled for inserting in the blanking interval of at least one horizontal video scan line of said quadrature and amplitude modulated chroma information signal a burst of said first carrier frequency prior to said double balanced modulating means, whereby said output signal contains a burst of said second carrier frequency due to frequency translation of said first carrier frequency burst.

36. The arrangement of claim 32, further comprising means coupled for separating a luma information signal from said color video signal and means coupled for frequency modulating said luma information signal at a third carrier frequency, said third carrier frequency being selected so that sidebands of the frequency modulated luma signal will not appreciably interfere with sidebands of said bisequential chroma signal amplitude modulated with suppressed carrier.

37. The arrangement of claim 36, further comprising means coupled for additively combining said frequency modulated luma signal with said bisequential chroma signal amplitude modulated with suppressed carrier.

38. The arrangement of claim 36, wherein said color video signal is accompanied by an audio information signal, further comprising means coupled for supplying said audio information signal frequency modulated at a fourth carrier frequency and means for additively combining said frequency modulated audio signal with said frequency modulated luma signal and said bisequential chroma signal amplitude modulated with suppressed carrier said fourth carrier frequency being selected so that sidebands of said frequency modulated audio signal will not appreciably interfere with sidebands of the luma and chroma signals with which additively combined.

39. The arrangement of claim 36, wherein said third carrier frequency is substantially higher than said second carrier frequency.

40. The arrangement of claim 32, wherein said second carrier frequency is an odd multiple of one half the horizontal video line scan frequency.

41. The arrangement of claim 32, further comprising means for submitting said bisequential chroma signal amplitude modulated with suppressed carrier to a transfer channel.

42. The arrangement of claim 41, wherein said transfer channel comprises a recording medium.

43. The arrangement of claim 41, wherein said transfer channel is subject to time base error.

44. The arrangement of claim 32, wherein said color video signal includes a synchronization pulse in at least some horizontal video scan lines, further comprising means for synchronizing the phase of said switched first carrier frequency signal with said synchronizing pulses, whereby said switched first carrier frequency signal is at 0° phase angle when a blue (B−Y) line of chroma information is to appear at the output of said double balanced modulating means and at 90° when a red (R−Y) line of chroma information is to appear at the output of said double balanced modulating means.

45. The arrangement of claim 32, further including means coupled for alternating the polarity of said second carrier reference on adjacent pairs of horizontal video scan lines prior to said mixing means, whereby said output signal comprising bisequential chroma information amplitude modulated at said second carrier frequency with suppressed carrier has the carrier polarity alternating on adjacent pairs of horizontal video scan lines and has modulation sideband frequencies comprising odd multiples of one quarter the horizontal scan line frequency.

46. The arrangement of claim 45, further comprising means for producing a marker signal indicative of the phase of said alternating polarity second carrier and means coupled for combining said marker signal with said bisequential chroma information signal.

47. An arrangement for processing a color video signal, in which bisequential chroma information amplitude modulated at a second carrier frequency with suppressed carrier is translated to quadrature modulated chroma information amplitude modulated at a first carrier frequency, comprising:
  (a) means coupled for separating said bisequential chroma signal from said color video signal;
  (b) means coupled for producing a reference signal at said first carrier frequency phase switched between zero degrees and ninety degrees on adjacent horizontal video scan lines;
  (c) means coupled for producing a reference signal at said second carrier frequency;
  (d) means coupled for mixing said phase switched first carrier frequency signal and said second carrier frequency signal to produce a sum and difference frequency signal;
  (e) means coupled for multiplying said bisequential chroma signal amplitude modulated at said second carrier frequency with suppressed carrier by said sum and difference frequency signal to produce an output signal representing bisequential chroma information amplitude modulated at said first carrier frequency with the carrier phase angle changing between zero degrees and ninety degrees on adjacent horizontal video scan lines;
  (f) means for delaying by one horizontal video scan line the output of said multiplying means; and
  (g) means for additively combining the undelayed signal from said multiplying means with the line delayed signal, whereby a quadrature and amplitude modulated chroma information signal is produced.

48. The arrangement of claim 47, further comprising means for inserting a burst of said first carrier frequency during the blanking interval of alternate horizontal video scan lines of said multiplier output signal.

49. The arrangement of claim 48, wherein said burst inserting means comprises neans for generating said burst by gating a reference source of said first carrier frequency synchronously with blanking intervals of said multiplier output signal, and means for additively combining said burst with said multiplying means output signal.

50. The arrangement of claim 48, wherein said burst inserting means comprises a second double balanced modulator and means coupled for unbalancing said second double balanced modulator, said second double balanced modulator coupled to said unbalancing means for passing said multiplier output signal in the interim between the blanking intervals of horizontal video scan lines and for passing said first carrier frequency during the blanking intervals of alternate horizontal video scan lines.

51. The arrangement of claim 47, further including means for inserting a burst of said first carrier frequency during the blanking interval of each horizontal video scan line of said multiplying means output signal, the phase angle of said burst being 90° when inserted in a red (R−Y) horizontal video scan line and being 180° when inserted in a blue (B−Y) horizontal video scan line of said multiplying means output signal.

52. The arrangement of claim 51, wherein said burst inserting means comprises a second double balanced modulator and means coupled for unbalancing said second double balanced modulator, said second double balanced modulator coupled to said unbalancing means for passing said multiplier output signal in the interim between the blanking intervals of horizontal video scan lines and for passing said first carrier frequency with alternating phase angles of 90° and 180° during the blanking intervals of alternate horizontal video scan lines.

53. The arrangement of claim 47, wherein said color video signal is subject to time base error and has a burst of said second carrier frequency in at least some horizontal blanking intervals, further comprising means for separating said second carrier frequency bursts from said color video signal and providing said bursts to a time base error corrector.

54. The arrangement of claim 47, wherein said delaying means provides the line delayed signal 90° out of phase with the undelayed signal to said combining means, whereby the signal from said combining means comprises chroma information in National Television Systems Committee format.

55. The arrangement of claim 47, wherein said delaying means provides the line delayed signal with alternate polarity on adjacent horizontal video scan lines and said combining means receives the undelayed signal with constant polarity, whereby the signal from said combining means comprises chroma information in Phase Alternating Lines format.

56. The arrangement of claim 47, wherein said bisequential chroma information amplitude modulated at a second carrier frequency with suppressed carrier has a carrier which is polarity alternated on adjacent pairs of horizontal video scan lines and said video signal has a marker signal indicating the phase of such carrier polarity alternation, further comprising means for alternating the polarity of said second carrier reference signal synchronously with said marker signal, whereby the output of said multiplying means comprises bisequential chroma information amplitude modulated at said first carrier frequency with the carrier phase angle changing between zero degrees and ninety degrees on adjacent horizontal video scan lines, but with the effect of said second carrier polarity alternation being cancelled.

57. The arrangement of claim 47, wherein said color video signal includes luma information frequency modulated at a third carrier frequency, further comprising means for separating the modulated luma information from said color video signal; means for frequency demodulating said luma information; and means for additively combining the demodulated luma information signal with said quadrature and amplitude modulated chroma information signal.

58. The arrangement of claim 57 wherein said third carrier frequency is substantially higher than said second carrier frequency.

59. The arrangement of claim 57 wherein said color video signal includes audio information frequency modulated at a fourth carrier frequency, further comprising means for separating said audio information from said color video signal.

60. A method of processing a color video signal in which quadrature modulated chroma information amplitude modulated at a first carrier frequency is translated to bisequential chroma information amplitude modulated at a second carrier frequency with suppressed carrier, comprising the steps of:
(a) separating a signal representing said amplitude and quadrature modulated chroma information from said color video signal;
(b) switching the phase angle of a reference source of said first carrier frequency alternately between 0° and 90° on adjacent horizontal video scan lines;
(c) double balanced modulating said amplitude and quadrature modulated chroma signal with the phase switched first carrier frequency to produce an unmodulated bisequential chroma signal;
(d) double balanced modulating said unmodulated bisequential chroma signal with a reference source of said second carrier frequency to produce a bisequential chroma signal amplitude modulated with suppressed carrier at said second carrier frequency;
(e) separating a signal representing luma information from said color video signal;
(f) frequency modulating said luma signal at a third carrier frequency, said third carrier frequency being substantially lower than said second carrier frequency and being selected so that sidebands of the bisequential chroma signal amplitude modulated with suppressed carrier will not appreciably interfere with sidebands of the frequency modulated luma signal; and
(g) additively combining the bisequential chroma signal amplitude modulated with suppressed carrier and the frequency modulated luma signal to produce an output signal:

61. The method of claim 60, wherein the double balanced modulation with said second carrier frequency is periodically unbalanced to produce a burst of said second carrier frequency in horizontal blanking intervals of the bisequential chroma signal amplitude modulated with suppressed carrier.

62. The method of claim 60, wherein said color video signal is accompanied by an audio information signal, further comprising the steps of providing said audio signal frequency modulated at a fourth carrier frequency, and additively combining the frequency modulated audio signal with the frequency modulated luma signal and the bisequential chroma signal amplitude modulated with suppressed carrier.

63. The method of claim 60, further comprising submitting said output signal to a transfer channel.

64. The method of claim 63 wherein said transfer channel is a recording medium.

65. The method of claim 63 wherein said transfer channel is subject to time base error.

66. The method of claim 60, further comprising the step of polarity switching said second carrier frequency reference signal on adjacent pairs of horizontal video scan lines, whereby said output signal comprises bisequential chroma information amplitude modulated with suppressed carrier, the modulated carrier being at opposite polarity on adjacent pairs of horizontal video scan lines and the modulation sideband frequencies comprising odd multiples of one quarter the horizontal scan line frequency.

67. The method of claim 66, further comprising the steps of generating a marker signal indicative of the phase of said alternating polarity carrier and combining said marker signal with said output signal.

68. The method of claim 60 wherein said second carrier frequency is an odd multiple of one half the video scan line frequency.

69. A method of processing a color video signal, in which bisequential chroma information amplitude modulated at a second carrier frequency with suppressed carrier is translated to quadrature modulated chroma information amplitude modulated at a first carrier frequency, comprising the steps of:
(a) separating a representing bisequential chroma information amplitude modulated with suppressed carrier from said color video signal;
(b) double balanced modulating said bisequential chroma signal amplitude modulated with suppressed carrier, with a reference source of said second carrier frequency to produce an unmodulated bisequential chroma signal;
(c) switching the phase angle of a reference source of said first carrier frequency alternately between 0° and 90° on adjacent horizontal video scan lines;
(d) double balanced modulating said unmodulated bisequential chroma signal with the phase switched first carrier frequency to produce a bisequential amplitude and quadrature modulated chroma signal;
(e) delaying by one horizontal video scan line the said bisequential amplitude and quadrature modulated chroma signal;
(f) additively combining the undelayed and the delayed bisequential amplitude and quadrature modulated chroma signal to produce a simultaneous quadrature and amplitude modulated chroma signal;
(g) separating a signal representing frequency modulated luma information from said color video signal;
(h) frequency demodulating said separated luma signal; and
(i) additively combining the unmodulated luma signal and said simultaneous quadrature and amplitude modulated chroma signal.

70. The method of claim 69, further including the step of inserting a burst of said first carrier frequency during the blanking interval of alternate horizontal video scan lines of said bisequential amplitude and quadrature modulated chroma signal.

71. The method of claim 70, wherein the step of inserting said burst comprises the steps of first producing said burst by gating a reference source of said first carrier frequency synchronously with blanking intervals of said bisequential amplitude and quadrature modulated chroma signal and then additively combining said burst with said simultaneous amplitude and quadrature modulated chroma signal.

72. The method of claim 70, wherein the step of inserting said burst comprises unbalancing the double balanced modulation of said unmodulated bisequential chroma signal to pass said bisequential amplitude and quadrature modulated signal in the interim between blanking intervals of horizontal video scan lines and to pass said first carrier frequency during the blanking intervals of alternate horizontal video scan lines.

73. The method of claim 69, further including the step of inserting a burst of said first carrier frequency during the blanking interval of each horizontal video scan line of said bisequential amplitude and quadrature modulated chroma signal, the phase angle of said burst being 90° when inserted in a red (R−Y) horizontal video scan line and being 180° when inserted in a blue (B−Y) horizontal video scan line of said bisequential amplitude and quadrature modulated chroma signal.

74. The method of claim 73, wherein the step of inserting said burst comprises the steps of first producing a burst signal by gating a phase-switched source of said first carrier frequency synchronously with blanking intervals of said bisequential amplitude and quadrature modulated chroma signal and then additively combining said burst signal with said bisequential amplitude and quadrature modulated chroma signal.

75. The method of claim 73, wherein the step of inserting said burst comprises the steps of unbalancing the double balanced modulation of said unmodulated bisequential chroma signal to pass said bisequential amplitude and quadrature modulated chroma signal in the interim between blanking intervals of horizontal video scan lines and to pass said first carrier frequency with alternating phase angle of 90° and 180° during the blanking intervals of adjacent horizontal video scan lines.

76. The method of claim 69 wherein said color video signal is subject to time base error and has a burst of said second carrier frequency in at least some horizontal blanking intervals, further comprising the steps of separating said second carrier frequency bursts from said color video signal and providing said bursts to a time base error corrector.

77. The method of claim 69 wherein in the step of additively combining the delayed and undelayed bisequential amplitude and quadrature modulated chroma signals are 90° out of phase for all horizontal video scan lines, whereby the resulting simultaneous quadrature and amplitude modulated chroma information signal comprises chroma information in National Television Systems Committee format.

78. The method of claim 69 wherein in the step of additively combining, the line delayed signal is alternated in polarity on adjacent horizontal video scan lines and the undelayed signal is at constant phase angle, whereby the resulting simultaneous quadrature and amplitude modulated chroma information signal comprises chroma information in Phase Alternating Lines format.

79. The method of claim 69 wherein said bisequential chroma information amplitude modulated at a second carrier frequency with suppressed carrier has its carrier polarity alternated on adjacent pairs of horizontal video scan lines and said color video signal has a marker signal indicating the phase of such polarity alteration, further comprising the step of alternating the polarity of said second carrier frequency reference synchronously with said marker signal, whereby said unmodulated bisequential chroma signal is produced.

80. An arrangement for processing a color video signal in which quadrature modulated chroma information amplitude modulated at a first carrier frequency is translated to bisequential chroma information amplitude modulated at a second carrier frequency with suppressed carrier, comprising:
  (a) means coupled for separating a signal representing said amplitude and quadrature modulated chroma information from said color video signal;
  (b) means coupled for switching the phase angle of a reference source of said first carrier frequency between 0° and 90° on adjacent horizontal video scan lines;
  (c) means coupled for double balanced modulating said amplitude and quadrature modulated chroma signal with the phase switched first carrier frequency to produce an unmodulated bisequential chroma signal;
  (d) means coupled for double balanced modulating said unmodulated bisequential chroma signal with a reference source of said second carrier frequency to produce a bisequential chroma signal amplitude modulated with suppressed carrier at said second carrier frequency;
  (e) means coupled for separating a signal representing luma information from said color video signal;
  (f) means coupled for frequency modulating said luma signal at a third carrier frequency, said third carrier frequency being substantially lower than said second carrier frequency and being selected so that sidebands of the bisequential chroma signal amplitude modulated with suppressed carrier will not appreciably interfere with sidebands of the frequency modulated luma signal; and
  (g) means coupled for additively combining the bisequential chroma signal amplitude modulated with suppressed carrier and the frequency modulated luma signal to produce an output signal.

81. The arrangement of claim 80 further including means for periodically unbalancing said double balanced modulation with said second carrier frequency, thereby producing a burst of said second carrier frequency in horizontal blanking intervals of the bisequential chroma signal amplitude modulated with suppressed carrier.

82. The arrangement of claim 80 wherein said color video signal is accompanied by an audio information signal, further comprising means coupled for providing said audio signal frequency modulated at a fourth carrier frequency, and means coupled for additively combining the frequency modulated audio signal with the frequency modulated luma signal and the bisequential chroma signal amplitude modulated with suppressed carrier.

83. The arangement of claim 80, further comprising means for submitting said output signal to a transfer channel.

84. The arrangement of claim 83 wherein said transfer channel comprises a recording medium.

85. The arrangement of claim 83 wherein said transfer channel is subject to time base error.

86. The arrangement of claim 80, further comprising means coupled for polarity switching said second carrier frequency reference signal on adjacent pairs of horizontal video scan lines, whereby said output signal comprises bisequential chroma information amplitude modulated with suppressed carrier, the modulated carrier being of opposite polarity on adjacent pairs of horizontal video scan lines and the modulation sideband frequencies comprising odd multiples of one quarter the horizontal scan line frequency.

87. The arrangement of claim 86 further comprising means for generating a marker signal indicative of the phase of said alternating polarity carrier, and means coupled for combining said marker signal with said output signal.

88. The arrangement of claim 80 wherein said second carrier frequency is an odd multiple of one half the video scan line frequency.

89. An arrangement for processing a color video signal, in which bisequential chroma information amplitude modulated at a second carrier frequency with suppressed carrier is translated to quadrature modulated chroma information amplitude modulated at a first carrier frequency, comprising:
(a) means coupled for separating a signal representing bisequential chroma information amplitude modulated with suppressed carrier from said color video signal;
(b) means coupled for double balanced modulating said bisequential chroma signal amplitude modulated with suppressed carrier, with a reference source of said second carrier frequency, to produce an unmodulated bisequential chroma signal;
(c) means coupled for switching the phase angle of a reference source of said first carrier frequency alternately between zero and ninety degrees on adjacent horizontal video scan lines;
(d) means coupled for double balanced modulating said unmodulated bisequential chroma signal with the phase switched first carrier frequency to produce a bisequential amplitude and quadrature modulated chroma signal;
(e) means coupled for delaying by one horizontal video scan line said bisequential amplitude and quadrature modulated chroma signal;
(f) means coupled for additively combining the undelayed and the delayed bisequential amplitude and quadrature modulated chroma signal to produce a simultaneous quadrature and amplitude modulated chroma signal;
(g) means coupled for separating a signal representing frequency modulated luma information from said color video signal;
(h) means coupled for frequency demodulating said separated luma signal; and
(i) means coupled for additively combining said unmodulated luma signal and said quadrature and amplitude modulated chroma signal.

90. The arrangement of claim 89, further including means coupled for inserting a burst of said first carrier frequency during the blanking interval of alternate horizontal video scan lines of said bisequential amplitude and quadrature modulated chroma signal.

91. The arrangement of claim 90, wherein said burst inserting means comprise means coupled for first producing said burst by gating a reference source of said first carrier frequency synchronously with blanking intervals of said bisequential amplitude and quadrature modulated chroma signal and means coupled for additively combining said burst with said amplitude and quadrature modulated chroma signal.

92. The arrangement of claim 90 wherein said burst inserting means comprises means coupled for unbalancing said means for double balanced modulation of said unmodulated bisequential chroma signal, to pass said bisequential amplitude and quadrature modulated signal in the interim between blanking intervals of horizontal video scan lines and to pass said first carrier frequency during the blanking intervals of alternate horizontal video scan lines.

93. The arrangement of claim 89 further including means coupled for inserting a burst of said first carrier frequency during the blanking interval of each horizontal video scan line of said bisequential amplitude and quadrature modulated chroma signal, the phase angle of said burst being 90° when inserted in a red (R−Y) horizontal video scan line and being 180° when inserted in a blue (B−Y) horizontal video scan line of said bisequential amplitude and quadrature modulated chroma signal.

94. The arrangement of claim 93 wherein said burst inserting means comprises means coupled for first producing a burst signal by gating a phase-switched source of said first carrier frequency synchronously with blanking intervals of said bisequential amplitude and quadrature modulated chroma signal and means coupled for then additively combining said burst signal with said bisequential amplitude and quadrature modulated chroma signal.

95. The arrangement of claim 93 wherein said burst inserting means comprises means coupled for unbalancing said means for double balanced modulation of said unmodulated bisequential chroma signal, to pass said bisequential amplitude and quadrature modulated chroma signal in the interim between blanking intervals of horizontal video scan lines and to pass said first carrier frequency with alternating phase angles of 90° and 180° during the blanking intervals of alternate horizontal video scan lines.

96. The arrangement of claim 89 wherein said color video signal is subject to time base error and has a burst of said second carrier frequency in at least some horizontal blanking intervals, further comprising means coupled for separating said second carrier frequency bursts from said color video signal and means coupled for providing said bursts to a time base error corrector.

97. The arrangement of claim 89 wherein in said means for additively combining the delayed and undelayed bisequential amplitude and quadrature modulated chroma signals are 90° out of phase for all horizontal video scan lines, whereby the resulting non-bisequential quadrature and amplitude modulated chroma information signal comprises chroma information in National Television Systems Committee format.

98. The arrangement of claim 89 wherein in said means for additively combining, the line delayed signal is alternated in polarity on adjacent horizontal video scan lines and the undelayed signal is at constant phase angle, whereby the resulting non-bisequential quadrature and amplitude modulated chroma information signal comprises chroma information in Phase Alternating Lines format.

99. The arrangement of claim 89 wherein said bisequential chroma information amplitude modulated at a second carrier frequency with suppressed carrier has its carrier polarity alternated on adjacent pairs of horizontal video scan lines and said color video signal has a marker signal indicating the phase of such polarity alternation, further comprising means coupled for alternating the polarity of said second carrier frequency reference synchronously with said marker signal, whereby said unmodulated bisequential signal is produced.

100. A method for processing a color video signal in which bisequential chroma information frequency modulated at a first carrier frequency is translated to bisequential chroma information amplitude modulated at a second carrier frequency, comprising the steps of:
(a) separating a signal representing said bisequential frequency modulated chroma information from said color video signal;
(b) frequency demodulating said bisequential frequency modulated chroma signal;
(c) double balanced modulating the demodulated bisequential chroma signal with a reference source of said second carrier frequency to produce a bisequential chroma signal amplitude modulated with suppressed carrier at said second carrier frequency;
(d) separating a signal representing luma information from said color video signal;
(e) frequency modulating said luma signal at a third carrier frequency, said third carrier frequency being substantially lower than said second carrier frequency and being selected so that sidebands of the bisequential chroma signal amplitude modulated with suppressed carrier will not appreciably interfere with sidebands of the frequency modulated luma signal; and
(f) additively combining the bisequential chroma signal amplitude modulated with suppressed carrier and the frequency modulated luma signal to produce an output signal.

101. The method of claim 100 wherein the double balanced modulation with said second carrier is periodically unbalanced to produce a burst of said second carrier frequency in horizontal blanking intervals of the bisequential chroma signal amplitude modulated with suppressed carrier.

102. The method of claim 100 wherein said color video signal is accompanied by an audio information signal, further comprising the steps of providing said audio signal frequency modulated at a fourth carrier frequency, and additively combining the frequency modulated audio signal with the frequency modulated luma signal and the bisequential chroma signal amplitude modulated with suppressed carrier.

103. The method of claim 100, further comprising submitting said output signal to a transfer channel.

104. The method of claim 103 wherein said transfer channel comprises a recording medium.

105. The method of claim 103 wherein said transfer channel is subject to time base error.

106. The method of claim 100, further comprising the step of polarity switching said second carrier frequency reference signal on adjacent pairs of horizontal video scan lines, whereby said output signal comprises bisequential chroma information amplitude modulated with suppressed carrier, the modulated carrier being of opposite polarity on adjacent pairs of horizontal video scan lines and the modulation sideband frequencies comprising odd multiples of one quarter the horizontal scan line frequency.

107. The method of claim 106, further comprising the steps of generating a marker signal indicative of the phase of said alternating polarity carrier, and combining said marker signal with said output signal.

108. A method of processing a color video signal, in which bisequential chroma information amplitude modulated at a second carrier frequency with suppressed carrier is translated to bisequential chroma information frequency modulated at a first carrier frequency, comprising the steps of:
(a) separating a signal representing bisequential chroma information amplitude modulated with suppressed carrier from said color video signal
(b) double balanced modulating said bisequential chroma signal amplitude modulated with suppressed carrier, with a reference source of said second carrier frequency, to produce an unmodulated bisequential chroma signal;
(c) frequency modulating said unmodulated bisequential chroma signal at said first carrier frequency;
(d) separating a signal representing frequency modulated luma information from said color video signal;
(e) frequency demodulating said separated luma signal; and
(f) additively combining the unmodulated luma signal and the frequency modulated bisequential chroma signal.

109. The method of claim 108, further comprising the step of marking the frequency modulated bisequential chroma signal to identify the modulation component of the frequency modulated bisequential chroma information in the additively combined signal.

110. The method of claim 108 wherein said color video signal is subject to time base error and has a burst of said second carrier frequency in at least some horizontal blanking intervals, further comprising the steps of separating said second carrier frequency bursts from said color video signal and providing said bursts to a time base error corrector.

111. The method of claim 108 wherein said bisequential chroma information amplitude modulated at a second carrier frequency with suppressed carrier has its carrier polarity alternated on adjacent pairs of horizontal video scan lines and said color video signal has a marker signal indicating the phase of such polarity alteration, further comprising the step of alternating the polarity of said second carrier frequency reference synchronously with said marker signal, whereby said unmodulated bisequential chroma signal is produced.

112. An arrangement for processing a color video signal, in which bisequential chroma information frequency modulated at a first carrier frequency is translated to bisequential chroma information amplitude modulated at a second carrier frequency, comprising:
(a) means coupled for separating a signal representing said bisequential frequency modulated chroma information from said color video signal;
(b) means coupled for frequency demodulating said bisequential frequency modulated chroma signal;
(c) means coupled for double balanced modulating the demodulated bisequential chroma signal with a reference source of said second carrier frequency to produce a bisequential chroma signal amplitude modulated with suppressed carrier at said second carrier frequency;
(d) means coupled for separating a signal representing luma information from said color video signal;
(e) means coupled for frequency modulating said luma signal at a third carrier frequency, said third carrier frequency being substantially lower than said second carrier frequency and being selected so that sidebands of the bisequential chroma signal amplitude modulated with suppressed carrier will not appreciably interfere with sidebands of the frequency modulated luma signal; and (f) means coupled for additively combining the bisequential chroma signal amplitude modulated with suppressed carrier and the frequency modulated luma signal to produce an output signal.

113. The arrangement of claim 112, further comprising means for periodically unbalancing said means for double balanced modulation with said second carrier to produce a burst of said second carrier frequency in horizontal blanking intervals of the bisequential chroma signal amplitude modulated with suppressed carrier.

114. The arrangement of claim 112 wherein said color video signal is accompanied by an audio information signal, further compressing means coupled for providing said audio signal frequency modulated at a fourth carrier frequency, and means coupled for additively combining the frequency modulated audio signal with the frequency modulated luma signal and the bisequential chroma signal amplitude modulated with suppressed carrier.

115. The arrangement of claim 112 further comprising means coupled for submitting said output signal to a transfer channel.

116. The method of claim 115 wherein said transfer channel comprises a recording medium.

117. The method of claim 115 wherein said transfer channel is subject to time base error.

118. The arrangement of claim 112, further comprising means coupled for polarity switching said second carrier frequency reference signal on adjacent pairs of horizontal video scan lines, whereby said output signal comprises bisequential chroma information amplitude modulated with suppressed carrier, the modulated carrier being of opposite polarity on adjacent pairs of horizontal video scan lines and the modulation sideband frequencies comprising odd multiples of one quarter the horizontal scan line frequency.

119. The arrangement of claim 118, further comprising means coupled for generating a marker signal indicative of the phase of said alternating polarity carrier, and means coupled for combining said marker signal with said output signal.

120. An arrangement for processing a color video signal, in which bisequential chroma information amplitude modulated at a second carrier frequency with suppressed carrier is translated to bisequential chroma information frequency modulated at a first carrier frequency, comprising:

(a) means coupled for separating a signal representing bisequential chroma information amplitude modulated with suppressed carrier from said color video signal;

(b) means coupled for double balanced modulating said bisequential chroma signal amplitude modulated with suppressed carrier, with a reference source of said second carrier frequency, to produce an unmodulated bisequential chroma signal;

(c) means coupled for frequency modulating said unmodulated bisequential chroma signal at said first carrier frequency;

(d) means coupled for separating a signal representing frequency modulated luma information from said color video signal;

(e) means coupled for frequency demodulating said separated luma signal; and (f) means coupled for additively combining the unmodulated luma signal and the frequency modulated bisequential chroma signal.

121. The arrangement of claim 120, further comprising means coupled for inserting a marker signal indicative of the phase of the frequency modulated bisequential chroma information in the additively combined signal.

122. The arrangement of claim 120 wherein said color video signal is subject to time base error and has a burst of said second carrier frequency in at least some horizontal blanking intervals, further comprising means coupled for separating said second carrier frequency bursts from said color video signal and providing said bursts to a time base error corrector.

123. The arrangement of claim 120 wherein said bisequential chroma information amplitude modulated at a second carrier frequency with suppressed carrier has its carrier polarity alternated on adjacent pairs of horizontal video scan lines and said color video signal has a marker signal indicating the phase of such polarity alteration, further comprising means coupled for alternating the polarity of said second carrier frequency reference synchronously with said marker signal, whereby said unmodulated bisequential chroma signal is produced.

124. A signal recording medium having impressed thereon a color video signal comprising the additive combination of bisequential chroma information amplitude modulated with suppressed carrier at a first frequency and luma information frequency modulated at a second frequency.

125. The signal recording medium of claim 124, comprising a magnetic signal storage medium.

126. The signal recording medium of claim 124, comprising an optical signal storage medium.

127. The signal recording medium of claim 124, comprising a capacitive signal storage medium.

128. The signal recording medium of claim 124 wherein said color video signal includes periodic bursts of a reference frequency for use in correction of time base error occurring upon retrieval of said impressed signal.

129. The signal recording medium of claim 124 wherein said second frequency is substantially higher than said first frequency.

130. The signal recording medium of claim 124 wherein an audio information signal frequency modulated at a third carrier frequency is impressed thereon.

131. The signal recording medium of claim 130 wherein said audio information is additively combined with said color video signal prior being impressed on the recording medium.

132. The signal recording medium of claim 130 wherein said third carrier frequency is lower than said first carrier frequency.

133. The signal recording medium of claim 124 wherein the carrier polarity of said bisequential chroma information amplitude modulated with suppressed carrier alternates on adjacent pairs of horizontal video scan lines.

134. The signal recording medium of claim 133 wherein said color video signal further includes a marker signal for indicating the phase of said alternating carrier polarity.

* * * * *

UNITED STATES PATENT AND TRADEMARK OFFICE
CERTIFICATE OF CORRECTION

PATENT NO. : 4,123,774
DATED : OCT. 31, 1978
INVENTOR(S) : HJORTZBERG

It is certified that error appears in the above–identified patent and that said Letters Patent are hereby corrected as shown below:

Column 26, line 10, "at" should be -- of --

Signed and Sealed this

First Day of May 1979

[SEAL]

Attest:

RUTH C. MASON
Attesting Officer

DONALD W. BANNER
Commissioner of Patents and Trademarks